(12) United States Patent
Riggs et al.

(10) Patent No.: US 11,087,583 B2
(45) Date of Patent: Aug. 10, 2021

(54) APPARATUS AND METHODS FOR FACILITATING WAGERING ON GAMES CONDUCTED ON AN INDEPENDENT VIDEO GAMING SYSTEM

(71) Applicant: Everi Games, Inc., Austin, TX (US)

(72) Inventors: Keith Riggs, Austin, TX (US); Steven Meyer, Austin, TX (US); James McHugh, Austin, TX (US); Travis Bussey, Austin, TX (US); Loren Jacobs, Austin, TX (US)

(73) Assignee: Everi Games, Inc., Austin, TX (US)

( * ) Notice: Subject to any disclaimer, the term of this patent is extended or adjusted under 35 U.S.C. 154(b) by 16 days.

(21) Appl. No.: 16/511,354

(22) Filed: Jul. 15, 2019

(65) Prior Publication Data
US 2019/0340866 A1  Nov. 7, 2019

Related U.S. Application Data

(62) Division of application No. 15/703,396, filed on Sep. 13, 2017, now Pat. No. 10,565,818.

(60) Provisional application No. 62/400,021, filed on Sep. 26, 2016.

(51) Int. Cl.
*A63F 9/24* (2006.01)
*G07F 17/32* (2006.01)
*A63F 13/48* (2014.01)
*A63F 13/22* (2014.01)
*A63F 13/30* (2014.01)
*A63F 13/352* (2014.01)

(52) U.S. Cl.
CPC .......... *G07F 17/3211* (2013.01); *A63F 13/22* (2014.09); *A63F 13/30* (2014.09); *A63F 13/352* (2014.09); *A63F 13/48* (2014.09); *G07F 17/3216* (2013.01); *G07F 17/3225* (2013.01); *G07F 17/3244* (2013.01); *G07F 17/3276* (2013.01)

(58) Field of Classification Search
CPC .......... A63F 13/10; A63F 13/22; A63F 13/23; A63F 13/30; A63F 13/32; A63F 13/352; A63F 13/48; A63F 13/79; A63F 13/80; A63F 2300/538; A63F 2300/5533; A63F 2300/636; G07F 17/3262
See application file for complete search history.

(56) References Cited

U.S. PATENT DOCUMENTS

| 7,771,271 B2 | 8/2010 | Walker |
| 8,049,818 B2 | 11/2011 | Na |
| 2002/0123376 A1 | 9/2002 | Walker |

(Continued)

*Primary Examiner* — Lawrence S Galka
(74) *Attorney, Agent, or Firm* — The Culbertson Group, P.C.; Russell D. Culbertson

(57) ABSTRACT

A gaming system includes a video gaming system and one or more video monitors operatively connected to receive a game video signal. A wager input device is also included in the system and configured to receive a wager on a result in the video game. An image evaluation processing system is connected to receive the game video signal and is configured to evaluate the game video signal to identify a result in the game. The wager resolution system is connected to the image evaluation processing system and to the wager input device, and is configured to receive the wager and the result identified by the image evaluation processing system, and to resolve the wager based at least in part on that result.

18 Claims, 14 Drawing Sheets

(56) References Cited

U.S. PATENT DOCUMENTS

| | | |
|---|---|---|
| 2007/0024749 A1 | 2/2007 | Na |
| 2009/0221365 A1* | 9/2009 | Levy .................. G07F 17/3288 463/29 |
| 2012/0083331 A1 | 4/2012 | Carpenter |
| 2013/0198334 A1* | 8/2013 | Ikenaga .................. A63F 13/12 709/217 |
| 2014/0317566 A1 | 10/2014 | Ohara |
| 2014/0317744 A1 | 10/2014 | Turgeman |
| 2016/0028730 A1 | 1/2016 | Natarajan |
| 2016/0110903 A1 | 4/2016 | Perrin |
| 2016/0306974 A1 | 10/2016 | Turgeman |
| 2017/0078319 A1 | 3/2017 | Thompson |
| 2018/0077180 A1 | 3/2018 | Zhang |

* cited by examiner

APPARATUS AND METHODS FOR FACILITATING WAGERING ON GAMES CONDUCTED ON AN INDEPENDENT VIDEO GAMING SYSTEM

CROSS-REFERENCE TO RELATED APPLICATION

This application claims the benefit, under 35 U.S.C. § 120 and § 121, of U.S. patent application Ser. No. 15/703,396 filed Sep. 13, 2017 and entitled "Apparatus and Methods for Facilitating Wagering on Games Conducted on an Independent Video Gaming System." The entire content of this prior patent application is incorporated herein by this reference.

This application also claims the benefit, under 35 U.S.C. § 119(e), of U.S. Provisional Patent Application No. 62/400,021 filed Sep. 26, 2016 and entitled "Sports Tournament Gaming System and Method." The entire content of this provisional application is incorporated herein by this reference. The entire content of U.S. Pat. No. 9,443,394 entitled "Convertible In-Revenue and Out-of-Revenue Gaming System and Method with a Real-Time Streaming Video Feed and Display" is also incorporated herein by this reference.

COPYRIGHT NOTICE

A portion of the disclosure of this patent document contains material which is subject to copyright protection. The copyright owner has no objection to the facsimile reproduction of the patent document or the patent disclosure, as it appears in the U.S. Patent and Trademark Office records, but otherwise reserves all rights of copyright whatsoever.

TECHNICAL FIELD OF THE INVENTION

The invention relates to gaming systems and, more particularly, to devices and methods for collecting gaming results and facilitating wagering on those results. The invention also encompasses program products which may be executed to collect gaming results and facilitate wagering on those results.

BACKGROUND OF THE INVENTION

Wagering has long been popular through various gaming machines such as reel-type gaming machines (in which results are displayed via video-simulated or physical reels), electronic poker machines, electronic pachinko machines, and other gaming machines. In these types of gaming machines, a player places a wager at the gaming machine, activates the gaming machine for the wager, and the wager is resolved based on the result obtained for that activation of the game. This resolution may include the award of cash, credits, points, or other value in view of a result defined as a winning result for the game. Otherwise, the resolution for the wager may include the loss of the wager amount in view of a result defined as a losing result for the game. Some electronic gaming machines offer the ability to place additional wagers on different games offered concurrently on the gaming machine, while other gaming machines provide the chance at additional prizes for bonus games conducted within the framework of the original game for which the original wager was placed. Additionally, some electronic gaming systems allow competitive play in tournaments or otherwise in which players or teams of players compete against each other using some sort of scoring system. This competitive play may be "in-revenue" in which players must still enter wagers for the various plays in the underlying game, or "out-of-revenue" in which players or teams pay an entry fee in order to participate in the tournament, and no wagers are required on the plays in the underlying games.

Beyond the traditional wagering games conducted through electronic gaming machines, various video gaming systems have been developed for video games such as MORTAL KOMBAT®, MADDEN NFL®, SUPER SMASH BROS.®, and many more. Video game genres include real-time strategy games, fighting games, first-person shooter (FPS) games, and multiplayer online battle arena (MOBA) games. Popular video gaming systems (also referred to as "gaming platforms") include the various XBOX® and PLAYSTATION® products, which employ a dedicated game console connected to a suitable monitor and game controller. The game console includes a suitable processing system to execute video game program code, receive player inputs entered through the game controller, and generate a game video signal that is directed to the connected video monitor to display the game graphics over the course of play in the given game. General purpose computers such as PCs represent another type of video gaming system which facilitates high levels of customization in terms of video display and player control input. Regardless of the video gaming system, the video games may be conducted locally with the local player playing against the game (or a game-controlled character) or competing with another local player. Video games may also be conducted over a wide area network with various players competing from gaming consoles at different geographic locations.

With the wide popularity of video gaming, video gaming competitions commonly referred to as e-sports have also become very popular. E-sports competitions may be organized as tournaments conducted through various venues which accommodate spectators and which are televised or available on streaming media platforms to viewers at any location where suitable Internet access is available. E-sports competitions are offered on both an amateur and professional level, and wagering on e-sports matches is available through various e-sports betting books similar to betting books for traditional sports such as horse racing.

Video game competitions, either private competitions between recreational gamers or e-sports competitions, require some degree of manual setup regardless of the particular video gaming system. Generally, once the game software is executed on the console or other device, the player must make inputs through the given platform to request entry into a game, and must commonly manually enter other setup inputs (such as selecting maps/arenas, characters, weapons, or tools) to prepare for the conduct of the game prior to the actual game play. This sort of manual entry and setup makes it difficult to administer tournaments particularly outside of an e-sports venue. Furthermore, results of the games must be manually collected, and this manual collection slows and limits wagering options for the games.

SUMMARY OF THE INVENTION

The various aspects of the present invention are directed to methods and apparatus that facilitate obtaining video game results in an automated fashion and facilitate setting up and controlling tournaments and other competitions on video game platforms. Implementations of the present invention facilitate the desired control without any need for an application programming interface to the underlying video games, and are thus essentially independent of the video game program code and video gaming system.

A method according to one aspect of the present invention includes receiving a wager through a wager input device. This received wager is a wager that has been placed on a result in a game to be conducted through a video gaming system. The game is then conducted through the video gaming system and the gaming console or other gaming device (all referred to herein as a "gaming device") produces a video signal for the game which is directed to a monitor to display the game graphics over the course of play. According to this aspect of the invention, the video signal for the game is also received at an image evaluation processing system and the method includes evaluating the received video signal at the image evaluation processing system to identify the result in the game. The method then includes resolving the wager based at least in part on the result of the game identified by the evaluation of the video signal.

The result on which a wager may be placed according to this first aspect of the invention may be any identifiable result in the game, including a final result at a conclusion of the game or some interim result that may occur prior to the conclusion of the game. A final result in the game may, for example, be a result between two or more contestants at the conclusion of a match between those contestants. Continuing with this example, the final result may indicate that one of the contestants is the winner of the match. Alternatively with this example, a final result may be a ranking of contestants. An interim result for which a wager may be placed may comprise any identifiable event in the course of the game. For example, some games may provide contestants with two or more "lives," and an interim result may be defined as the loss of a life by a given one of the contestants in the course of the game. A gaming system implementing this first aspect of the invention may be configured to support wagers on any number of interim results for a given instance of a game in addition to one or more definitions of a final result.

Another aspect of the invention encompasses a gaming system having a gaming device (which may be a console or any other gaming device such as a PC) for a video gaming system and one or more video monitors operatively connected to receive a game video signal for a game conducted through the gaming device. A wager input device is also included in the system and configured to receive a wager on a result in the game. A gaming system according to this aspect of the invention further includes an image evaluation processing system and a wager resolution processing system. The image evaluation processing system is operatively connected to receive the game video signal and is configured to evaluate the game video signal to identify a result in the game. The wager resolution system is operatively connected to the evaluation processing system and to the wager input device, and is configured to receive the wager and the result identified by the image evaluation processing system, and to resolve the wager based at least in part on that result.

Because the method and system according to the first two aspects of the invention may be implemented through one or more general purpose or otherwise programmable processing devices, another aspect of the present invention encompasses program products storing program code. Program code stored on one or more data storage devices according to this aspect of the invention may include wager input program code, image evaluation program code, and wager resolution program code. The wager input program code is executable to receive a wager on a game in a video gaming system, while the image evaluation program code is executable to evaluate a game video signal generated for the game so as to identify a result in the game. The wager resolution program code is executable to receive the wager and the result identified by the image evaluation program code, and to resolve the wager based at least in part on the result identified by execution of the image evaluation program code.

These first three aspects of the invention have the advantage that they are independent of the game software per se and are equally applicable to any game that generates a game video signal to display the game graphics including ultimately the result for which the wager was placed. Because the game result is gleaned from an evaluation of the video signal which is used to generate the game graphics, the game may be any game conducted on a video gaming system such as a given generation XBOX®, PLAYSTATION®, or other console game, or a PC game, without any application programming interface to the game software. Thus aspects of the present invention facilitate wagering on results in video games which are already established and popular both for private gaming and tournament gaming.

In implementations according to any of the above-described aspects of the present invention, evaluating the video signal may include searching pixel data of a respective frame from the video signal for a result characteristic corresponding to the result in the game. An output indicative of the result may then be produced in response to detection of the characteristic corresponding to the result in the game.

Also, implementations may further include searching the pixel data of the respective frame for a threshold characteristic corresponding to a display graphic in which the result characteristic is displayed according to the game. When the threshold characteristic is not detected in the respective frame, it is apparent that the frame cannot include the game result and the searching may be aborted as to that frame. Searching may then continue for the threshold characteristic as to the pixel data for a subsequent frame from the video signal. A full search of the pixel data for the respective frame from the video signal, that is, a search sufficient to identify the desired result characteristic, may be performed in response to the detection of the threshold characteristic in the respective frame.

In any case, searching the pixel data for the result characteristic may include searching for alphanumeric characters at one or more locations of the frame, searching for one or more colors in the frame, or searching for one or more geometric shapes in the frame, or combinations of these.

Implementations according to any of the foregoing aspects of the invention may include the wager input device in a gaming machine that also includes the game console or other gaming device for conducting the game. Wager input devices for placing wagers on results in the games may also be included in separate devices such as dedicated wagering devices, gaming machines that themselves conduct common wagering games such as reel-type gaming machines, or devices such as PCs or mobile devices linked by a suitable network.

A wager resolution system in a gaming system according to the present invention may include a wagering backend processing system configured to determine the probability of the result occurring in the game. This probability may be applied together with the identified result to resolve the wager that has been placed on the given result occurring in the game. Where the wagering backend processing system is implemented with one or more general purpose data processing devices, the devices may be configured to perform their functionality with wagering backend program code.

A gaming system according to the above-mentioned aspect of the invention may further include a tournament processing device operatively connected to both the image evaluation processing system and to the gaming device or to the gaming device and one or more additional gaming devices for the video gaming system. This tournament processing device is configured (in some implementations via tournament program code) to receive play requests from two or more players, to produce setup control signals, and to output the setup control signals to the gaming device or to the gaming device and the one or more additional gaming devices. The setup control signals are configured to set up and initiate a game on the video gaming system between the two or more players through the gaming device where the gaming device supports multiple players or through the gaming device and one or more additional gaming devices where each player prefers (or must) play through a separate gaming device.

Other aspects of the present invention apply the game video signal frame searching to control tournaments of video games which may be conducted on any video gaming system. In one of these aspects of the invention, a method includes receiving a video signal for a game setup sequence of a game to be conducted on a video gaming system and evaluating the video signal to identify one or more game setup states for the game, each game setup state corresponding to a game setup screen image. This method further includes generating gaming device setup control signals and communicating those gaming device setup control signals to a gaming device. These gaming device setup control signals comprise inputs to fill one or more input fields of the game setup screen images and to initiate play on the video gaming system between predetermined contestants.

In another aspect of the invention for controlling video game tournaments, a gaming system includes a gaming device for a video gaming system, and one or more video monitors operatively connected to receive a game video signal for a game on the video gaming system. As in the above-mentioned aspect of the invention relating to identifying results in the game, the gaming system according to this aspect of the invention includes an image evaluation processing system operatively connected to receive the game video signal. However in this aspect of the invention, the image evaluation processing system is configured to evaluate the game video signal to identify one or more game setup states for the gaming device and corresponding game setup screen images. A tournament processing device is included in the gaming system and is operatively connected to the image evaluation processing system and to the gaming device. The tournament processing device according to this aspect of the invention is configured to receive play requests for the game, to produce gaming device setup control signals, and to output the gaming device setup control signals to the gaming device. The gaming device setup control signals include inputs to fill one or more input fields of the one or more game setup states and to initiate play on the video gaming system between predetermined contestants.

A program product according to the tournament control aspect of the present invention includes image evaluation program code and tournament program code. In this aspect of the invention, the image evaluation program code is executable to evaluate the game video signal generated by the gaming device of a video gaming system and to identify one or more game setup states for the gaming device and corresponding game setup screen images. Tournament program code is executable to generate gaming device setup control signals and communicate those gaming device setup control signals to the gaming device. The gaming device setup control signals comprise inputs to fill one or more input fields of the one or more game setup screen images and to initiate play on the video gaming system between predetermined contestants.

In aspects of the present invention for controlling tournaments conducted through various video gaming systems, all of the above-described video frame searching implementations are also applicable. However, in the case of controlling tournaments, the searching is for setup fields included in the graphics of the game setup sequences rather than for result characteristics corresponding to a result in the game.

These and other advantages and features of the invention will be apparent from the following description of representative embodiments, considered along with the accompanying drawings.

DESCRIPTION OF REPRESENTATIVE EMBODIMENTS

Figure 1:
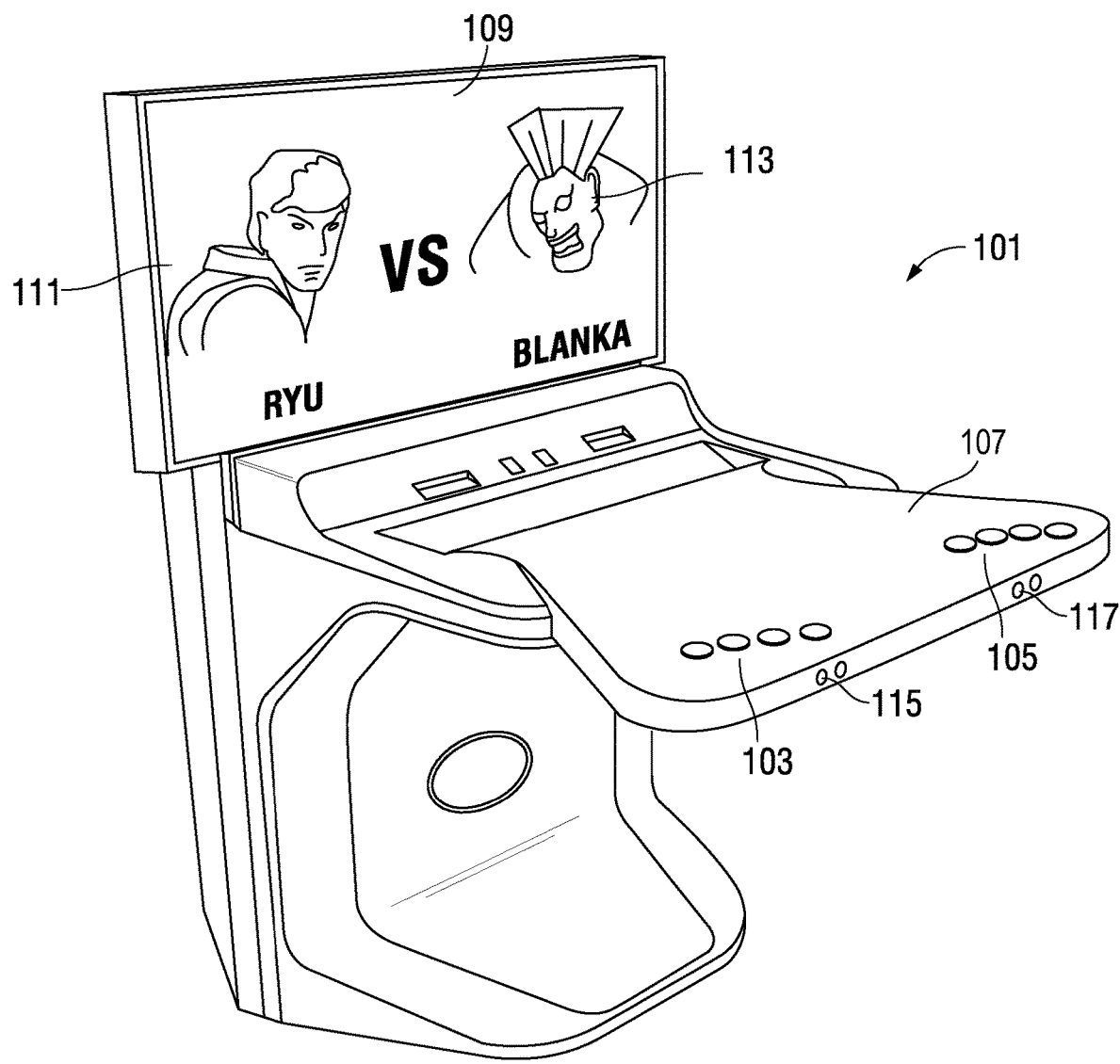
FIG. 1 is a view in perspective of an example gaming machine configurable to provide one or more games on a video gaming system in accordance with one or more embodiments encompassed under the present invention.

Referring to FIG. 1, an example gaming machine 101 is configured to allow two players to play a video game against each other and/or against players competing through other gaming machines of a video gaming system. To accommodate two players, example gaming machine 101 includes dual player button decks 103 and 105 located on a button deck support 107 so that the players may position themselves either sitting or standing to face the display screen 109 of the gaming machine. Display screen 109 is illustrated showing an interactive competition game with game characters (also referred to as "avatars") 111 and 113. Each player button deck 103 and 105 includes controls that enable a respective player to provide player inputs in the course of the game such as to control their respective character's movements, attacks, defenses, and perhaps other actions or activity in the course of the game so as to accumulate points or otherwise compete in the game. One or more jacks 115 may be provided in addition to player button deck 103 and one or more jacks 117 may be provided in addition to player button deck 105. These jacks 115 and 117 may be positioned on the front edge of button deck support 107, under that support, or at any other convenient location, and may comprise universal I/O connectors or gaming platform-specific connectors. Jacks 115 and 117 enable each player to connect a game controller device (e.g. game controller 317 shown in FIGS. 3 and 4) and use the game controller device to provide player inputs to the game.

Figure 2:
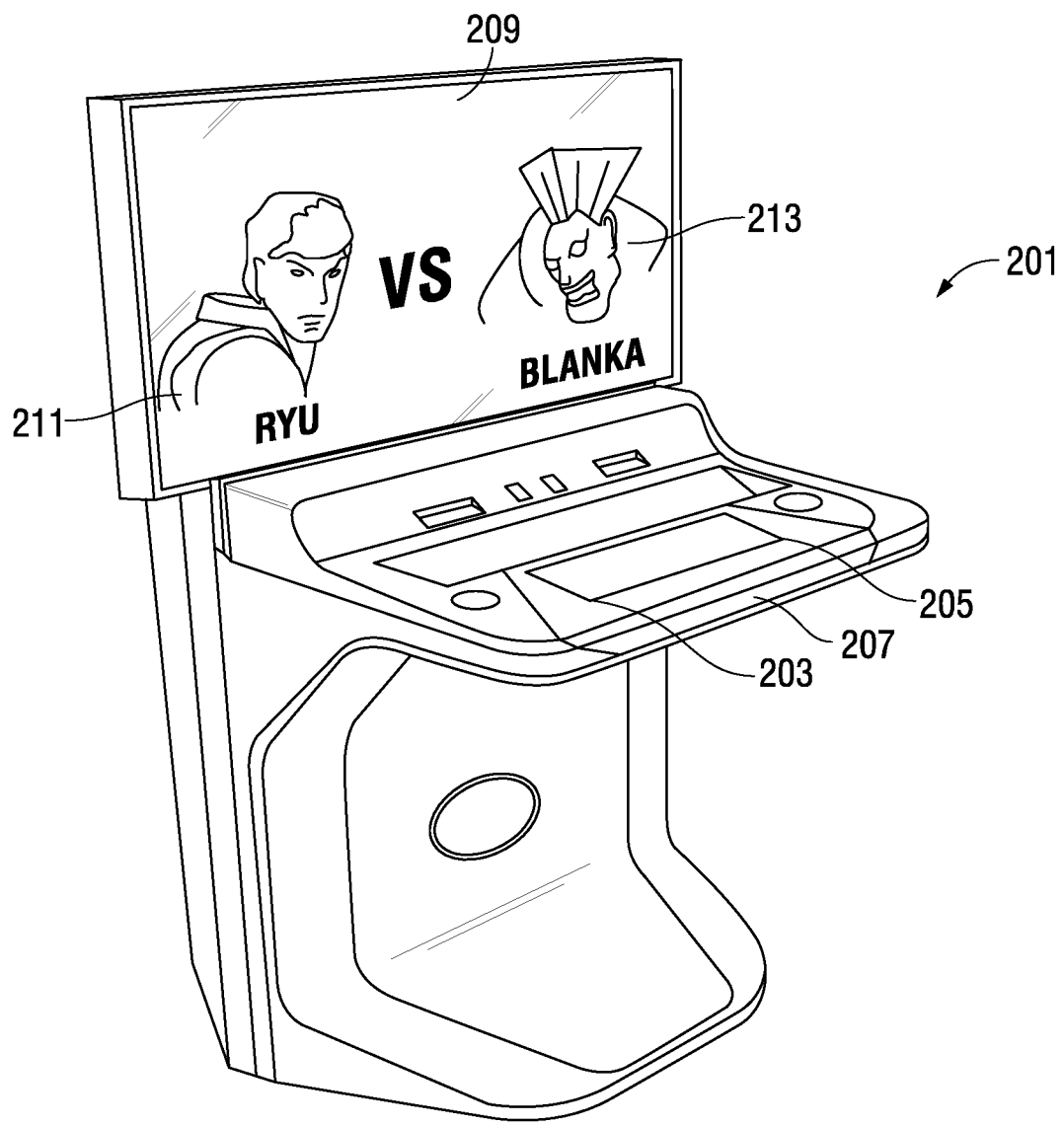
FIG. 2 is a view in perspective of another gaming machine configurable to provide one or more games on a video gaming system in accordance with one or more embodiments.

FIG. 2 shows an alternative gaming machine 201, similar to gaming machine 101, but placing player button decks 203 and 205 in a more central location of button deck support 207. Gaming machine 201 includes display screen 209 shown in this example as displaying game characters 211 and 213. Jacks (not shown) may also be included in gaming machine 201 corresponding to jacks 115 and 117 shown in the example of FIG. 1. Although both gaming machines 101 and 201 include dual button panels to facilitate two-player gaming at the gaming machine, both gaming machines may be configured to allow only a single player to play games through the respective gaming machine. Of course, other gaming machine embodiments according to the various aspects of the present invention may be configured only for single-player play at that gaming machine or for more than two players.

As will be discussed in more detail below, the games available through the example gaming machines 101 and 201 may be games that are played through popular video gaming systems such as the various generation XBOX® platforms and the various generation PLAYSTATION® platforms. The example characters 111, 113, 211, and 213 are game characters from the STREET FIGHTER® game series which includes titles for the XBOX® and PLAYSTATION® platforms, and well as for PC. In order to facilitate play through these popular video game systems, gaming machines 101 and 201 include at least one gaming console for one of these systems. For example, gaming machine 101 may house an XBOX ONE® console. It is also possible that a gaming machine such as gaming machine 101 houses multiple different video gaming system consoles to accommodate player preferences. Controls shown for gaming machines 101 and 201, such as at least some of the buttons included in button panels 103 and 105 in FIG. 1, and the devices which may be connected to jacks 115 and 117 in FIG. 1, may be controls which provide inputs to the one or more video gaming system consoles included in the gaming machine. Regardless of the gaming device or gaming devices included in the gaming machine, some aspects of the present invention facilitate wagering on various results that may be obtained in these games. Other aspects of the present invention facilitate control of games conducted through these video gaming systems to allow extra-platform control of tournaments (that is, control from outside of the platform).

Figure 3:
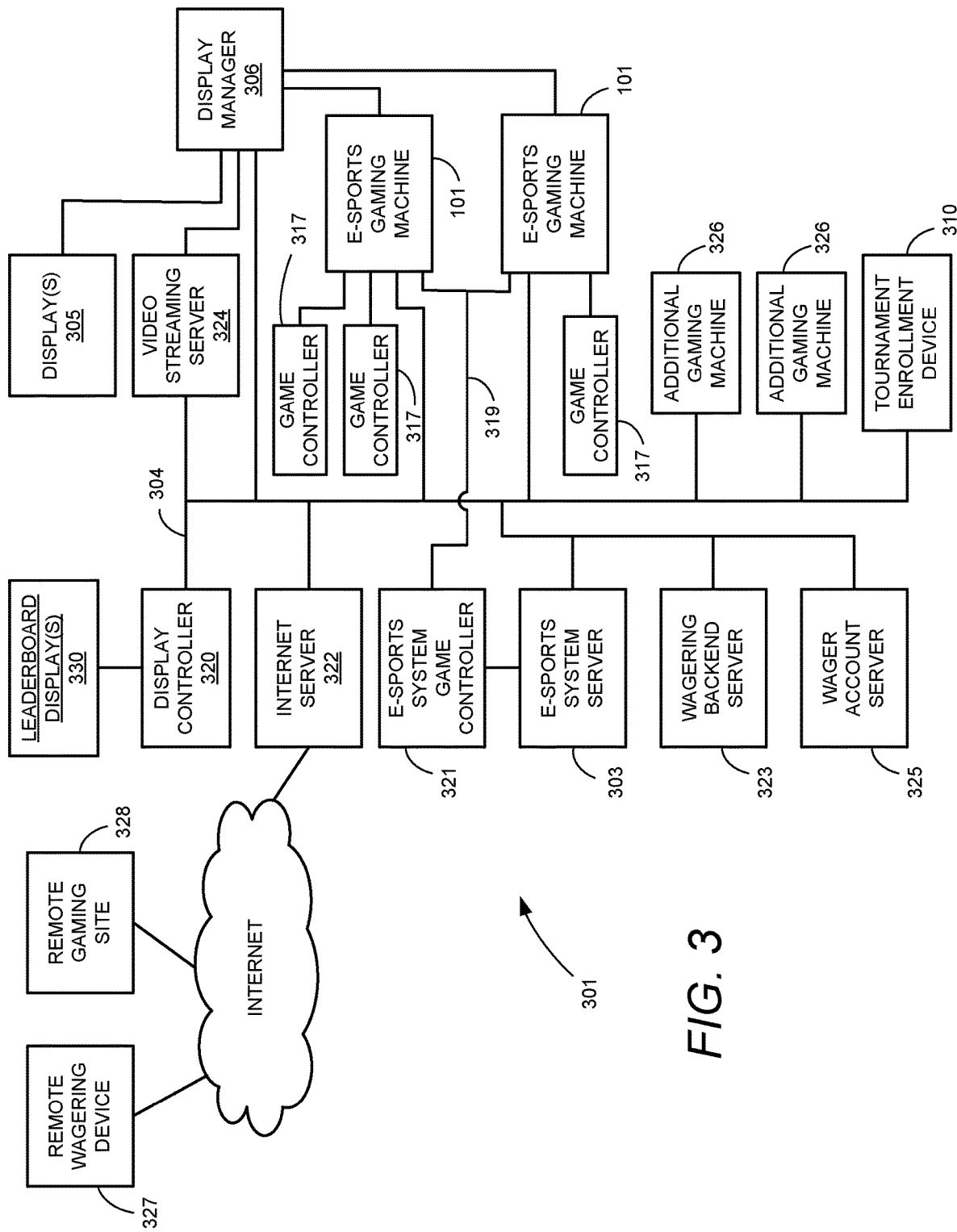
FIG. 3 is a block diagram illustrating a gaming system embodying aspects of the present invention.

FIG. 3 illustrates an example e-sports gaming system 301 configurable to provide one or more competitive games which may support tournament play and wagering in accordance with one or more embodiments. E-sports gaming system 301 includes one or more e-sports gaming machines 101 connected to e-sports system server 303 through a suitable network 304 which may comprise any suitable wired and/or wireless network. E-sports gaming machines 101 are also connected to an e-sports system game controller (which may be referred to as a "virtual game controller") 321 which is illustrated in this example system 301 as having a communication path 319 separate from the network 304. The nature of the communications to and from e-sports gaming machine 101 will be described further below particularly in connection with FIG. 4.

E-sports gaming system 301 further includes a wagering backend server 223, a wager account server 325, Internet server 322, video streaming server 324, display manager 306, and additional gaming devices 326. These additional devices are preferably interconnected in network 304.

E-sports gaming machines 101 are also each connected to one or more game controllers 317 and to the display manager 306. The connection between each game controller 317 and the respective e-sports gaming machine 101 may be through a respective jack associated with the e-sports gaming machine such as jacks 115 and 117 shown in FIG. 1. As discussed in connection with FIG. 1 above, the game controllers which allow a player to make game control player inputs in the course of a video game conducted through the e-sports gaming machine 101 may also be integrated into the e-sports gaming machine and may comprise the control panels 103 and 105 as shown in FIG. 1. The connection to display manager 306 may be any suitable connection for communicating a video signal output from gaming machine 101 to display manager 306. For example, the connection between a given gaming machine 101 and display manager may comprise an HDMI, VGA, or some other connection through which a video signal (or data from which a video signal may be generated) may be communicated. Display manager 306 may direct the video signal in the appropriate format to displays 305 to allow patrons to watch e-sports games in real time and to watch replays and recasts of e-sports games.

FIG. 3 also shows that e-sports gaming system 301 may communicate with external devices such as a remote wagering device 327 or a remote gaming site 328 which may itself include numerous wagering devices. FIG. 3 shows these external devices and systems connected over the Internet, however, any communications link may be employed to support the communications described further below, particularly in connection with the flowchart of FIG. 5.

E-sports system 301 supports the play of e-sports games particularly through popular video gaming systems and facilitates wagering on various results that may occur in these games. For example, a player may login to a video gaming system supported at e-sports gaming machine 101 and play a game on that platform. The play may be competitive against one or more other players or may be against an AI (game-controlled character) supported by the game. In other types of games the player or players may traverse an obstacle course or track and compete to produce the best score determined by any suitable metric or combination of metrics. The player may also enter wagers on various results that may occur in the game such as point totals, times (in clocked racing games for example), either at the completion of a game or at some point within the course of a game. System users other than the player may also wager on one or more results that may occur in the game, and these results may or may not be the same results on which a video game player places a wager. The results on which wagers may be placed will be discussed further below in connection with FIGS. 5-8. The other user may be a player also participating in the same game through another gaming machine 101 or through any other gaming device with connectivity to the network supported by the video gaming system, or may be a spectator with respect to the video game played through e-sports gaming machine 101 such as a user at another gaming machine which supports e-sports wagers or a local wagering device 326 in FIG. 3, or a remote wagering device such as device 327 or a device at a remote gaming site such as site 328.

E-sports system server 303 may function in system 301 to set up, initiate, and monitor, games played on e-sports gaming machines 101. E-sports system server 303 may also (in cooperation with wagering backend server 323 and wager account server 325) determine and award payouts for wager-determinant conditions detected in the games played on the e-sports gaming machines. Although system 301 may allow players to select players against which they compete in a given game conducted through e-sports gaming machines 101, and may allow manual set up and initiation of games, embodiments of the system may facilitate e-sports tournaments that are set up and initiated by or through e-sports system server 303 functioning alone or with other elements in the system as a tournament processing device. For e-sports tournaments conducted through system 301, a player may sign up or enroll for a tournament through a player enrollment device 310 where a player may input player information, such as by sliding a player card, driver's license or other readable ID card or by using a keypad to enter requested information, and pay a fee, if required. Such a player enrollment device may be attended by a casino employee, or may be an unattended, self-service device. The player enrollment device functions may also be implemented in a gaming machine 101, additional gaming machine 326, or at a remote device or system such as remote wagering device 327 or a device at remote gaming site 328. Regardless of how and where the player information is entered, the information is transmitted to the e-sports system server 303. An operator of e-sports system 301 may organize one or more tournaments for simultaneous processing by e-sports system server 303 and organize the enrolled players according to the tournaments that the players have been signed up to play. Players may be called to play a given round of a tournament at selected times or they may be able to play on a first come first serve basis depending upon the tournament. At selected times, e-sports system server 303 may transmit selected player information to selected e-sports gaming machines 101 to be displayed on respective display screens 109 or other display screens associated with the gaming machines 101 to identify one or more competitors, such as two competitors for a two-person gaming machine 101, at the respective gaming machines 101. E-sports system server 303 may also transmit one or more instructions to each participating gaming machine 101 to select the particular tournament game to be played and initiate play at the participating gaming machine 101. These communications to select a particular tournament game and initiate play, or any other communications that must be executed by the video gaming device included in the gaming machine, may be performed through e-sports virtual game controller 321 as will be described further below. The player information may also be displayed on selected external displays 305 to enable spectators and bettors to see who is competing and what the game is to be played. Processes for setting up and controlling tournaments through e-sports system server 303 will be described in further detail below in connection with the flow diagram of FIG. 9. Where e-sports system server 303 administers e-sports tournaments, it may also maintain tournament player scores and rankings in the fashion disclosed in incorporated U.S. Pat. No. 9,443,394. Current rankings in tournaments may be communicated to display controller 320 for controlling one or more displays 330 to display leaderboard information such as current leaders. Display controller 320 may also cause video of the e-sports game players to be displayed at leaderboard displays 330 similarly to the player video displayed as described in U.S. Pat. No. 9,443,394.

Wagering backend server 323 functions in system 301 to provide probabilities for various results which may happen in games played through the system. In particular, wagering backend server 323 may provide predictive analytics based on past activity of game play to determine the probability of results happening in a game played through system 301 and on which a wager may be placed. In some cases, result probabilities provided by wagering backend server may not be based on past game play or may be based only partially on past game play, and may be generated in some other suitable fashion.

Wager account server 325 in FIG. 3 functions to support user accounts for facilitating wagering activity. Generally, a user wishing to place wagers in e-sports system 301 will establish an account maintained by wager account server 325, and will have some value (either monetary value or conceivably non-monetary value such as player points) in the account. Wagering accounts may be opened and maintained in any suitable way. For example, users may be allowed to open and fund an account remotely through an Internet web page or through a tournament enrollment device 310. E-sports gaming machines 101, and other gaming machines such as gaming machine 326, may also include features to allow a user to fund a wagering account maintained through wager account server 325. Some implementations of system 301 may also allow wager funding on a wager-by-wager basis through a user's credit or debit card and/or through some other credit or funding mechanism. Wagers placed in the system 301 may be deducted from the user's account maintained through account server 325, and any winnings may be credited to that account.

Additional gaming devices 326 may comprise gaming machines of the type discussed below in connection with FIG. 13. These additional gaming machines may or may not allow play in e-sports games, but may allow wagers placed on e-sports games conducted by players on gaming machines 101. As will discussed below in connection with FIG. 13, gaming machine 326 may display an e-sports competition on one or more of the displays associated with that gaming machine while the player at that machine plays a standard wagering game such as a video card game or a reel-type game, for example. The player at a gaming machine 326 may be enabled to bet on any result in the displayed e-sports game conducted through gaming machine 101, such as the winner or loser of the e-sports game or the number of points scored by one or more competitors in the e-sports game, or some other final or interim result for which wagering is supported through the wagering backend server 323.

Remote wagering device 327 may comprise any suitable device through which wagers may be placed on e-sports games conducted through gaming machines 101. For example, 327 may be a smart phone, tablet, laptop, or PC running an application that enables a user to view a wagering screen and place bets on results in e-sports games played through gaming machines 101 or through a gaming machine 101 and one or more other gaming devices on the given video gaming system (that is, gaming devices which may or may not be included in a gaming machine 101 or in system 301). Alternatively, remote wagering device 327 may comprise a wagering kiosk that provides a wagering interface through which a user may place bets on results in e-sports games played through gaming machines 101 or through a gaming machine 101 and one or more other gaming devices. Remote wagering device 327 may also receive and display streaming video of e-sports games monitored through e-sports gaming system 301.

Remote gaming site 328 may comprise a casino or other wagering facility having e-sports wagering kiosks or e-sports wagering-enabled gaming machines such as gaming machine 326. Displays at remote gaming site 328 (which may include displays associated with e-sports wagering-enabled gaming machines and other devices at the remote gaming site), may display e-sports games which are monitored through system 301 to allow the remote users to follow the action in the e-sports games, particularly those on which the users have placed wagers. Remote gaming site 328 may also include gaming machines such as gaming machines 101 through which e-sports games are played.

Video streaming server 324 is included in system 301 to provide video streams of e-sports games that are monitored by the system and on which wagers may be placed according to aspects of the present invention. In some embodiments, video streaming server 324 may receive data representing any or all video signals received at display manager 306, and may convert those signals to a format suitable for streaming through Internet server 322.

It should be noted that the block diagram of FIG. 3 separates components according to their function in system 301, and is not intended to imply that the functions must be performed through separate physical devices. For example, a single processing device may be programmed or otherwise configured to perform the functions of the e-sports system sever 303 and virtual game controller 321. Similarly, the functions of wagering backend server 323 and wager account server 325 may be performed on a single processing device such as a server with sufficient capacity. The invention is not limited to any particular arrangement of processing devices to perform the various functions provided in e-sports gaming system 301.

Figure 4:
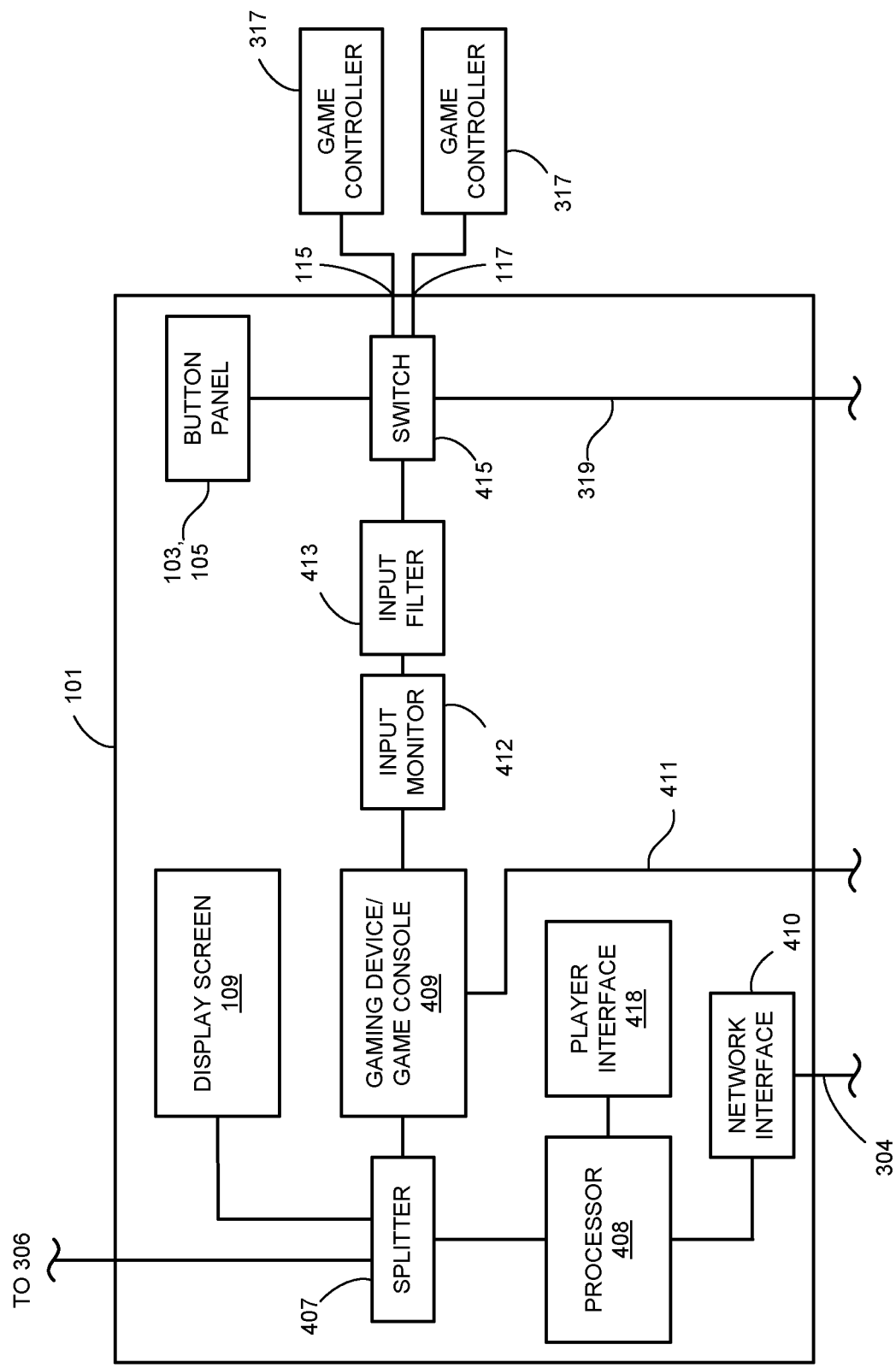
FIG. 4 is a block diagram illustrating a gaming machine which may be employed in an embodiment of the present invention.

Referring now to the block diagram of FIG. 4, gaming machine 101 includes a gaming device (a game console or any other type of gaming device) 409 that is operatively connected to button panels 103 and 105, and to external game controllers 317 through jacks 115 and 117. Gaming device 409 is also operatively connected to provide a video output to a video signal splitter 407 which splits the signal into multiple streams. These multiple streams of the video signal output from gaming device 409 are directed in this illustrated embodiment to display 109 of the gaming machine, and also to a gaming machine processor 408 which serves as an image evaluation processor as will be described below in connection with FIGS. 5-8. The video output signal from gaming device 409 is also directed to display manager 306 (FIG. 3) so that the video may be displayed as desired on displays 305 and also converted to a streaming format for display at remote devices. Gaming device 409 may comprise an XBOX®, PLAYSTATION®, or other gaming console or system (such as a PC) and is operable to present a game for one or more players and to communicate with the applicable gaming system through network connection 411. It is noted that network connection is a separate connection in this embodiment since gaming device 409 will generally have its own onboard network interface device (not shown). Also, network connection 411 may be to network 304 or a separate local area network that provides Internet access to device 409. Local inputs during the play of a game through gaming device 409 may be provided by players through integrated player controls 103 and 105, or through game controllers 317 which may be connected via jacks 115 and 117. Other inputs, particularly inputs for setting up a game in a tournament, may be provided through communications path 319 which connected to the virtual controller 321 shown in FIG. 3. All of the input routes are through a switch 415 which may be controlled through virtual controller 321 as will be described below in connection with FIG. 9. The example e-sports gaming machine 101 shown in FIG. 4 further includes an input monitor 412 interposed together with an input filter 413 between gaming device 409 and switch 415. As will be described further below in connection with FIG. 11, input monitor 412 is operable to monitor inputs during the course of play in a game to detect prohibited play such as automated play which could provide a player with an unfair advantage in a game. Input filter 413 is included to block certain prohibited inputs in the course of game play such as a "pause" command that might otherwise be available for gaming device 409.

FIG. 4 also shows that gaming machine 101 includes a player interface 418. Player interface 418 is illustrated here as being connected to processor 408 and functions to allow a player at gaming machine 101 to interact with system 301 separately from game play through gaming device 409. For example, player interface 418 may allow the player to place wagers on their own and other e-sports games. In some embodiments player interface 418 may include a currency acceptor, credit card, or player card reader, and controls such as physical or virtual (touchscreen-implemented) buttons. These elements allow the player to enter or insert value into the gaming system 301 which may be tracked, for example, by wager account server 325 in FIG. 3, and may further allow the player at the gaming machine to select both the type of result for a wager and also the wager amount. Player interface 418 in this example embodiment communicates across network 304 through network interface 410 included in gaming machine 101.

Figure 5:
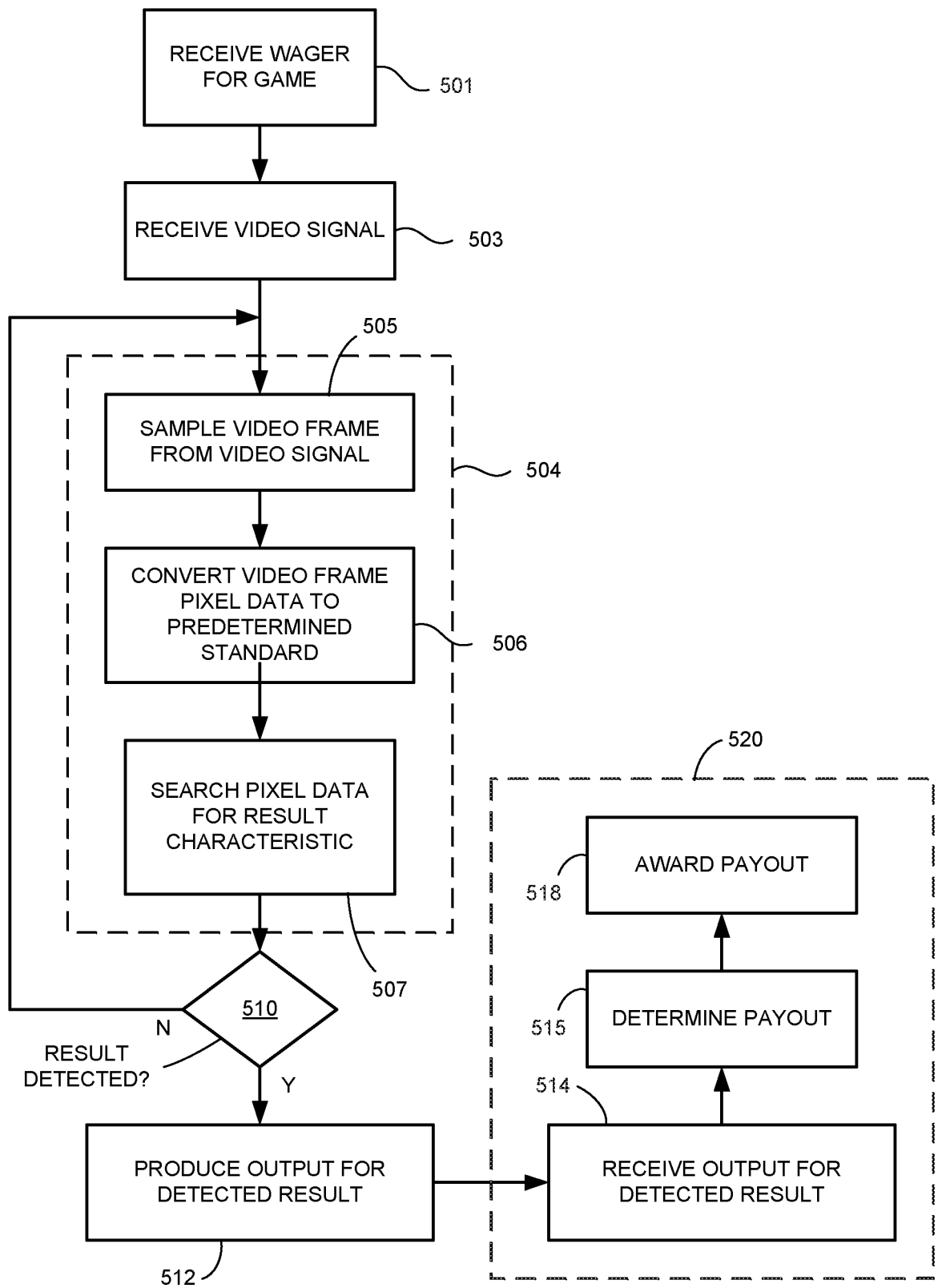
FIG. 5 is a process flow chart showing a method of identifying a result in a game and resolving a wager on that result according to one or more embodiments of the present invention.

FIG. 5 illustrates a method according to one aspect of the invention. In particular the method shown in FIG. 5 illustrates how a video signal from a video game is processed to resolve a wager on a result in the video game. The method includes receiving a wager for a result in the game as shown at process block 501. The method also includes receiving a video signal for the game as shown at process block 503. The process then goes through a series of steps shown within dashed box 504 which represent an image evaluation process which ultimately detects a result in the video game so that the wager received at process block 501 may be resolved. If the result is detected as indicated by an affirmative outcome at decision box 510, the process includes producing an output identifying the detected result as indicated at process block 512 and communicating that output to a process shown in dashed box 520 for resolving the wager placed at 501. This output is received as indicated at process block 514 and the payout, if any, for the wager is identified at process block 515. Any payout awarded as indicated at process block 518.

In the context of the example gaming system 301 shown in FIG. 3, and gaming machine shown in FIG. 4, the steps shown in dashed box 504 plus the step shown at process block 512 are steps that may be performed by the processor 408 in FIG. 4 serving as an image evaluation processing system. The steps shown in dashed box 520 are steps that may be performed by e-sports system server 303 shown in FIG. 3 in cooperation with wagering backend server 323 and wager account server 325.

The wager received at process block 501 may be received from a gaming machine such as gaming machine 101 involved in the e-sports game or may be received from any other wagering device configured to place a wager for the video game e-sport contest. For example, the wager may be placed through a remote wagering device such as a device 327 shown in FIG. 3 or at a kiosk or other wagering device at a remote gaming site 328 in FIG. 3. Also, the wager received for the game at process block 501 in FIG. 5 could be received from an additional gaming machine such as one of the additional gaming machines 326 shown in FIG. 3. Regardless of from where and specifically how the wager is received, the wager has the effect of setting the result to be detected by the evaluation shown in dashed box 504 in FIG. 5. For example, a patron may place a wager that a given contestant, either a character in the game or a player controlling a character in the game, will win a given match in the video game representing an e-sport contest. In that case a state in the game from which the result can be detected is a state in which the video game generates an image showing one of the contestants as the winner for that contest. As another example, a patron may place a wager that a given contestant, again either a game character or a player controlling a given character in the contest, will be the first to lose a "life" in the course of an e-sport match. In this example the state in the game from which the result can be detected is the state in which the video game first generates an image showing that a character has lost a life in the contest. This latter example is an example of a result which is an interim result in the game, while the former example is an example where the result to be detected may a final result in the game. Given the connection between the wager received at process block 501 and the result to be detected (and the video game state which shows the result to be detected) which is the subject of the evaluation process shown in dashed box 504, it will be appreciated that the process steps shown in FIG. 5 are conducted for each wager received for the game and that these processes are conducted in parallel by the data processing systems which perform the various processing steps. That is, for a given e-sport contest each wager which defines a result to be detected generates an instance of the process shown in FIG. 5.

In the context of the example system and e-sports gaming machine shown in FIGS. 3 and 4, the video signal received as shown at process block 503 in FIG. 5 is received by processor 408 from splitter 407 which splits the video output from the gaming device 409. The video signal may be in any form which may be output from the gaming device such as HDMI and VGA for example. Regardless of the specific video format, and as is well known in the art, the video signal comprises a stream of data defining a series of image frames which are displayed sequentially on a display device (such as device 109 in FIGS. 1 and 4) in order to produce the desired video image on the display device. The display device shows the series of frames rapidly at a suitable frame rate to produce a desired smoothness of motion for the video. Each frame in the series of frames making up the video signal received at process block 503 in FIG. 5 is made up of a series of pixels with each pixel defining the light to be produced in the display device a particular point in two dimensions across the display screen.

The evaluation process shown in dashed box 504 includes sampling a video frame from the video signal as indicated at process block 505. The sampling step may include simply storing the data representing a frame from the sequence of video frames in suitable storage of the implementing processing device, processor 408 in the example of FIG. 4. The illustrated method in FIG. 5 also includes converting the video frame data to pixel data according to a predefined standard as shown at process block 506. This conversion may, for example, produce a set of pixel data that represents a two dimensional array of pixels stored in any suitable data format. The evaluation process then includes searching the pixel data of the frame output from process block 506 for a result characteristic corresponding to the result to be detected in the game. This searching process is shown at process block 507 in FIG. 5 and may be performed by any suitable technique, including by comparing the pixel data from process block 506 to a set of stored data (which may be referred to as "result image definition data") which defines an image or portion thereof expected to be displayed for the result to be detected. Such a comparison performed at process block 507 is conducted to determine if there is a match between the pixel data produced according to process block 506 and the stored result image definition data for the result to be detected (the result set by the wager received at process block 501). For example, assume that the wager received for the game at process block 501 is a wager that player A will ultimately win a given video game contest against player B. This wager sets the wager result to be detected as the state of the video game in which one of the players or their avatar/game character is shown as the winner of the contest. In this case the stored data for a comparison to the pixel data from process block 506 (where a data comparison technique is used) is data which defines the display in the game showing the overall result and indicating that one of the players (or their avatar/game character) has won the contest. If the comparison conducted at process block 507 in this case indicates a match in pixel data, it can then be determined from the matching which player has won and thus the result is detected. If the result is not detected as indicated by a negative outcome at decision box 510, the process returns back to sample and process/evaluate another video frame from the video signal. However, if the result is detected by the search indicated at process block 507, the process proceeds to process block 512 to produce an output identifying the detected result.

The output produced at process block 512 may comprise any suitable output that will facilitate the process steps shown in dashed block box 520, namely, determining the payout for the wager, if any, and awarding that payout. Going back to the example in which the wager was that player A will win in the game against player B, the output produced at process block 512 would be any output that identifies whether or not player A has won the game. If player A has lost the instance of the video game, the payout determination at process block 515 may be that no payout should be made and thus no award would be paid at process block 518. However, if the output at process block 512 indicates that player A has won, the process at block 515 determines the payout based on the applicable odds which may for example be determined by a suitable odds setting arrangement such as wagering backend server 323 in FIG. 3. In any event the payout determined at process block 515 is awarded in some suitable fashion as indicated at process block 518. This awarding step in the case of system 301 shown in FIG. 3 may include an instruction from e-sport system server 303 to wager account server 325 to increment the patron's account by the determined payout amount, (which may be in the form of credits redeemable for value, cash, player club points, or in any other form).

Figure 6:
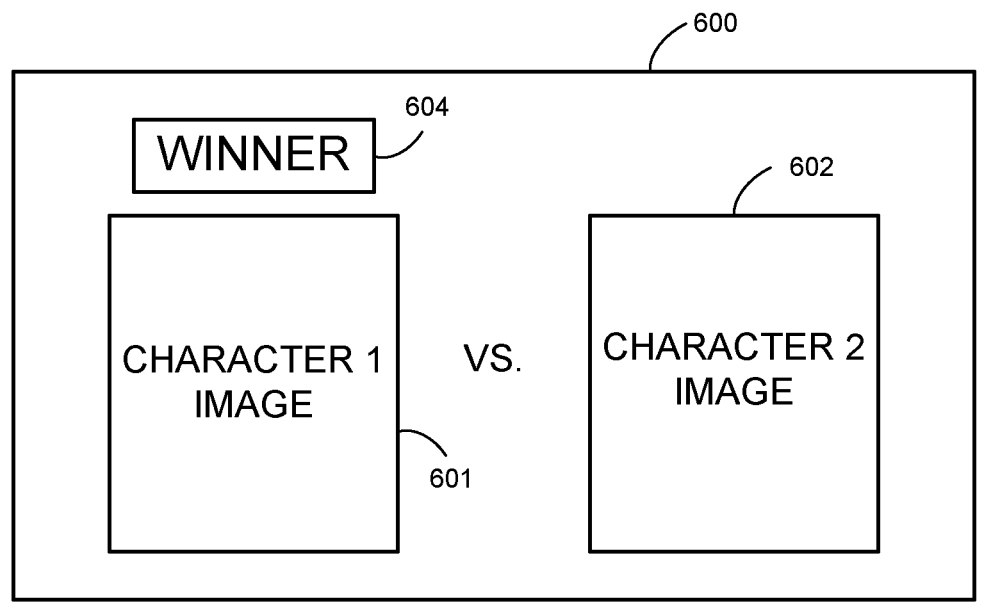
FIG. 6 is a schematic representation of a game image from which a game result may be identified according to various aspects of the present invention.
Figure 7:
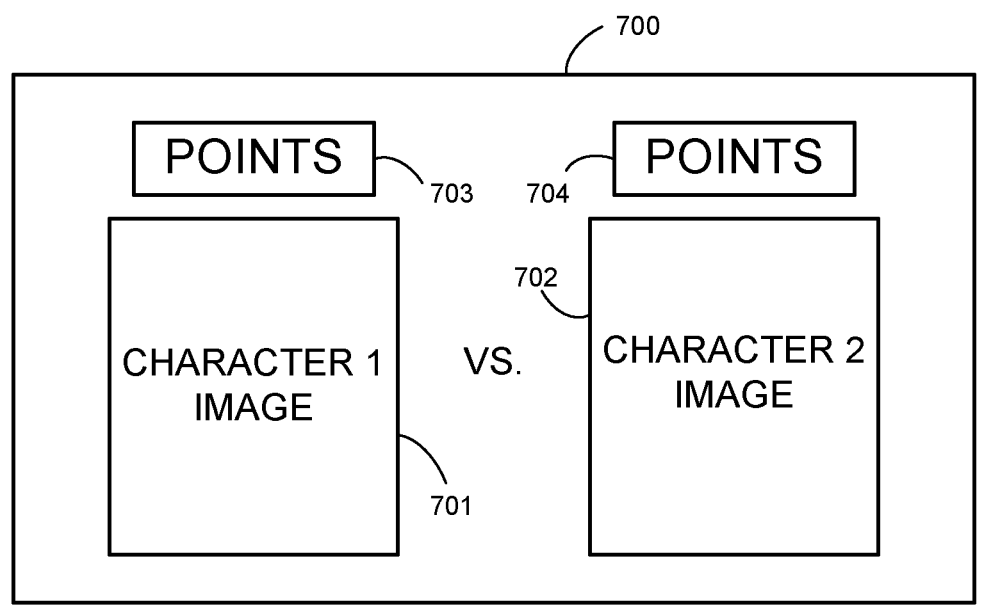
FIG. 7 is a schematic representation of an alternative game image from which a game result may be identified.
Figure 8:
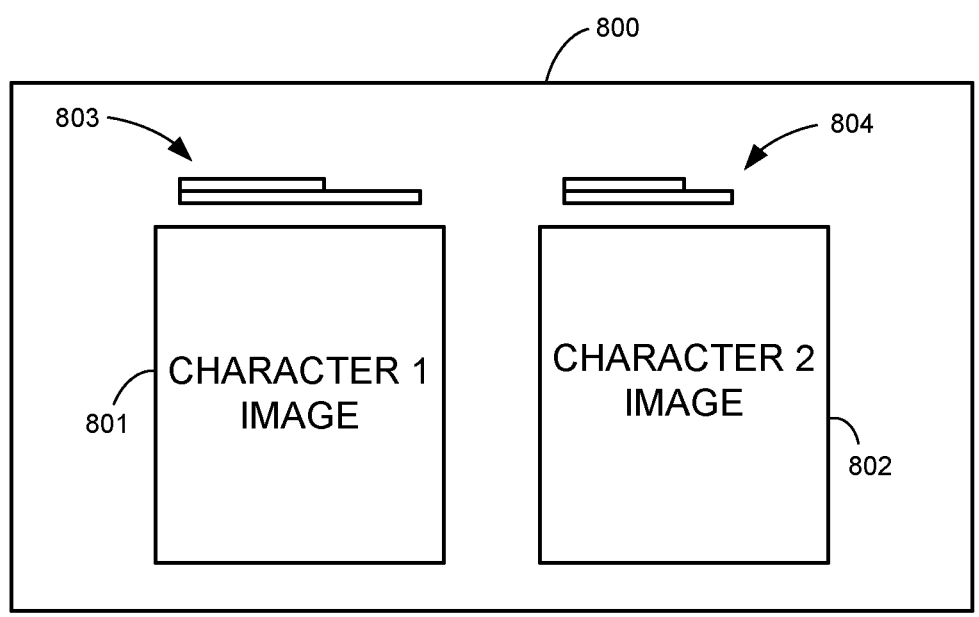
FIG. 8 is a schematic representation of another game image from which a result in a game may be identified, where the result is an interim result in the game.

The schematic representations of video game images (that is, screenshots) of FIGS. 6-8 may be used to describe examples of instances of the process shown in FIG. 5 and certain elements of the process which may be employed in various embodiments of the invention. Referring first to the example screen display 600 of FIG. 6, the display represents a display that may be produced in the video game at the conclusion of a contest between a character 1 and character 2. In this example the display includes an area 601 which will contain an image of character 1 and also an area 602 which will contain an image of character 2. Another area 604 on the display includes a banner or descriptive text such as the term "WINNER" in a position in relation to the character that has won the match, in this case character 1. Referring back to the example in the previous paragraphs discussing FIG. 5, character 1 may be a character controlled by player A whereas character 2 may be a character controlled by player B. In this example, the search of pixel data performed at process block 507 in FIG. 5 will be a search for a screen display containing the result characteristic indicating parts of the display shown in FIG. 6 or a screen display containing the opposite result characteristic indicator in which the WINNER banner is not in area 604 but is in an area located above character 2 in area 602. Where the search for the result characteristic is performed by comparing the pixel data generated for the given image frame with stored result image definition data, the comparison for FIG. 6 would result in a match of pixel data defining the term "WINNER" in the display and/or other result indicating characteristics of the display. It should be noted here that if the video screen display had produce pixel data showing the term "WINNER" positioned over the image of character to that is player B's character, this would also indicate the result in the contest and would produce a positive outcome at decision box 510 in FIG. 5. However, in this latter case the output produced according to the process at block 512 in FIG. 5 would indicate that player A had lost the contest.

The search for a result characteristic (as at 507 in FIG. 5) comprising a textual label as in the example of FIG. 6, provides a convenient example for describing a manner in which the present invention may detect a result in the video game on which a wager is placed. However, embodiments of the present invention are certainly not limited to searching for textual or alphanumeric labels in the image frame being evaluated. Numerous other result characteristics might be used in a given embodiment depending somewhat upon the nature of the image frame being evaluated. For example, a video game which may be used in a gaming system such as system 301 in FIG. 3 might be configured so that the result of a contest is always displayed in a box defined in the display as a rectangle or some other geometric pattern, and the position of that box in the display may indicate which contestant won the contest. In this case, the search, whether by comparison of stored result image indicating data or otherwise, might be for the geometric pattern in the display and not for an alphanumeric characters. Other example result characteristics which might be the subject of the search at block 507 of FIG. 5 might be a certain color in a certain area of the image frame. Also the search at block 507 in FIG. 5 might be for two or more result characteristics to provide higher confidence in accurately detecting the result.

In order to reduce the amount of processing that must be performed in the search at process block 507 in FIG. 5, and depending upon the video game generating the image frames under evaluation, some implementations of the present invention may initially search the pixel data of a given frame for some threshold characteristic distinct from the result itself that will only be present in a frame showing the result to be detected. For example, the image represented in FIG. 6 includes the characters "VS." in the display showing the result of the contest. Where such a threshold characteristic exists, an embodiment of the present invention may include a separate threshold search that is performed to detect the threshold characteristic prior to or as part of the search indicated at process block 507 in FIG. 5. If the threshold characteristic is detected the search may continue for the result to be detected. However, if the threshold characteristic is not detected, the process may loop back to begin processing the next video frame sampled according to process block 505 in FIG. 5.

Referring now to the example of FIG. 7, the image from which the video frame pixel data is produced does not rely on a textual label such as the term "WINNER" as in FIG. 6, but rather point totals for the match. In this case the display 700 would include an area 701 showing character 1 and an area 702 showing an image of character 2. A point total for the match is included at a given position proximate to each character image, area 703 above area 701 and area 704 above area 702. In this example, the search to be conducted at 507 in FIG. 5 might be a search for point totals, that is, numeric values, in the areas 703 and 704. The search conducted at 507 in FIG. 5, whether by a pixel data comparison technique or otherwise, would in this case not only search for the numeric values in the expected areas, but would also include the step of evaluating the point totals detected to determine which player/character had the higher point total and thus won the contest. Of course, a threshold characteristic search may be performed in connection with the example display of FIG. 7, such as for the textual label "VS." as described above in connection with FIG. 6.

FIG. 8 shows yet another example of a video game image from which a result in the video game may be detected. In this particular example the image 800 may be one displayed during the course of a game and before an overall result for the game may be determined. Thus the result to be detected from the image may be an interim result. The image 800 includes an area 801 containing an image of character 1 and an area 802 containing an image of character 2 at a given point in time in the game. In the example of a combat game, the image may show a point in time in which the two characters are in the midst of combat. In this example, the game includes status bars, in this case two separate bars, in an area proximate to the given character. Status bars 803 are associated with character 1 and status bars 804 are associated with character 2. Each set of status bars 803 and 804 may, for example, include a health bar and a strength or power bar. The result to be detected in image 800 may, for example, be a result that is indicated by the set of status bars. For example, a wager received at 501 in FIG. 5 may be a wager that player A (who controls character 1 in the game from which image 800 is taken) will lose a life first in the contest before player B (who controls character 2). The game may be configured such that every time a character loses a life a health bar associated with that character reduces to zero so as to disappear from the screen until the character re-spawns. Thus the result to resolve a wager regarding the first player to lose a life in the contest can be detected from an image in the game in which the health bar for one of the characters first reduces to zero. In this example scenario, the search conducted at 507 in FIG. 5 could be for a representation of a player health bar at a zero level and then for which character the zero health bar is associated. From this information an output identifying the detected result may be produced according to block 512 in FIG. 5.

In each of the examples described above in connection with FIGS. 6-8, the wager is resolved by a result in a contest between two characters. Of course in other games there may be three or more characters which may each be controlled by a different player. It is also possible that characters controlled by different players may represent a team and a wager may be placed on a result associated with team play. In each case, the search process performed at block 507 in FIG. 5 would search for some characteristic in the given image under evaluation which indicates a result from which the wager placed for the game may be resolved.

It should be noted that wagers may be placed in the process of FIG. 5 on results which are transient in the game, and thus appear in an image from the video stream for only a limited number of images. This is particularly the case for interim results such as the above example of the first character to lose a life in the game. The limited number of image frames showing a result affects the sampling rate from the incoming video stream in the sense that the sampling rate must be high enough to ensure detection of a transient result from which the given wager may be resolved.

The above examples described in connection with the process shown in FIG. 5 each refer to a result associated with an individual instance of a video game conducted through a gaming machine 101 in FIGS. 1, 3, and 4. The present invention is not, however, limited to individual game results. For example, a patron may place a wager that a given player will win a given tournament among many players. Such a wager can only be resolved after a number of instances of the video game until ultimately a winner of the tournament is declared in accordance with the tournament rules. In this case, the process steps shown in dashed box 504 in FIG. 5 may be performed for each instance of a game in the tournament and the result of that instance reported to e-sport system server for processing in accordance with dashed box 520. However, the processing here may include maintaining the individual game results so that the ultimate tournament winner can be identified. Thus the process at block 514 may include maintaining and tabulating the result information, and the process would proceed to determine the payout at process block 515 only once the tournament winner has been identified from the result outputs for the various individual matches in the tournament.

In order to facilitate setting up tournaments between e-sports players and facilitate player progression through the given tournament, e-sports gaming system 301 shown in FIG. 3 includes an arrangement that allows the match set up in the underlying e-sports game to be overridden by the e-sports gaming system. Typically in an e-sports game conducted through a platform such as XBOX ONE®, a player logs into an XBOX ONE® console, selects a game to play, and then navigates through a setup process for the game to select various options and to select an opponent or have the system select an opponent (which may be another player or an AI). The setup overriding arrangement according to some embodiments of the present invention blocks local controller inputs that an e-sports player might otherwise make, and in the place of the local controller inputs makes virtual controller inputs to select an opponent and otherwise control the game setup process.

Figure 9:
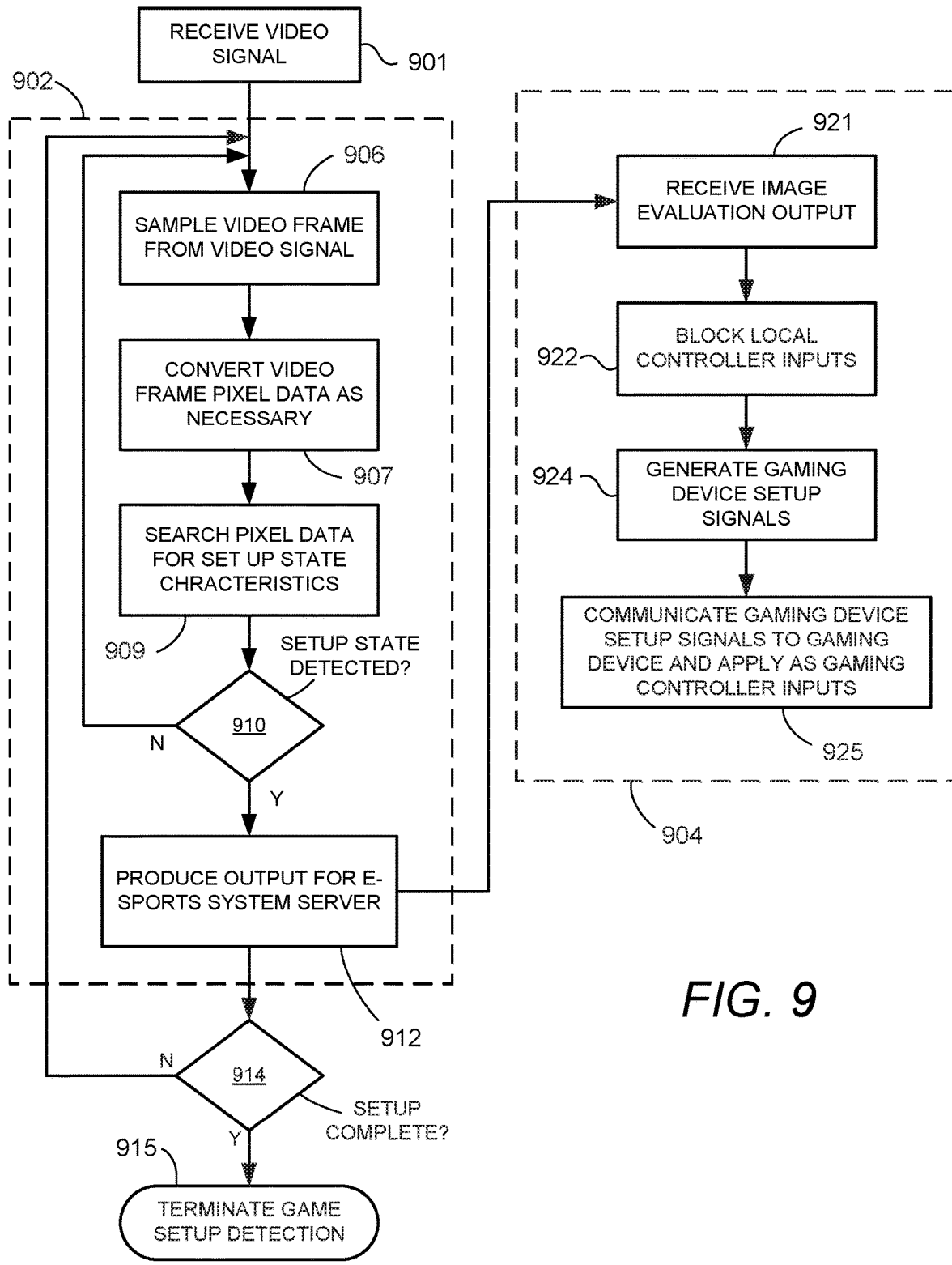
FIG. 9 is a process flow chart showing a method of setting up tournament play in a game according to one or more embodiments of the present invention.

FIG. 9 shows process for controlling e-sports game setup according to an implementation of the present invention. The process of FIG. 9 includes first receiving a video signal from the e-sports gaming device as shown at process block 901. This video signal may be a signal split from the gaming device by splitter 407 shown in FIG. 4. The process then includes a number of steps shown in dashed box 902 which detect a game setup state in the game and produce a suitable output when the state is detected. FIG. 9 also shows a number of steps in dashed box 904 which respond to the output indicating the setup state is detected. This response is to generate inputs and communicate those inputs to the gaming device to set up play for a given player.

The example process shown in dashed box 902 is similar to the result detection process shown in FIG. 5 in that it relies on sampling video frames from the game device to detect a particular image state. In the process of FIG. 5 that state of the screen image conveys a result in the game, while in the process of FIG. 9 the state detected is a setup state apparent from an image frame of the received video signal and corresponding screen image. The process includes sampling a video frame from the video signal as shown at process block 906 and then converting the video frame pixel data as necessary as shown at process block 907. These processes at 906 and 907 of FIG. 9 correspond to the processes at block 505 and 506 in FIG. 5 and all of the variations and characteristics of those processes apply equally to the processes at 906 and 907. The process further includes searching the pixel data for a setup state as shown at process block 909. In the event the setup state is detected from the operation at process block 909, the process includes branching from decision box 910 to produce an output for the tournament server as shown at process block 912. If the setup state is not detected, as indicated by a negative outcome at decision box 910, the process loops back to sample another frame at process block 906. Once the output has been produced for the processes in dashed box 904 according to this example, the process determines whether set up is complete (that is, will be complete after the processes at dashed box 904 are completed). This may be discerned from the setup state detected by the search indicated at process block 909. If set up is complete as indicated by an affirmative outcome at decision box 914, the process simply terminates as indicated at 915. However, if set up is not complete, the process loops back to sample another image from the video signal to initiate the process for detecting the next setup state in the game setup process.

The search techniques described above in connection with process block 507 of FIG. 5 apply equally to the search performed at block 909 in FIG. 9. However, in the case of process block 909, the search is for pixel data that would be expected at a given setup state of the game. Where the search is conducted by comparing the pixel data from the sampled frame, to stored data, the stored data would be data defining pixels of an image or portion of an image included in the image frame for the setup state to be detected. An example of such a state will be described below in connection with FIG. 10.

In response to the output produced as shown at process block 912 and received at process block 921, the example process shown in FIG. 9 includes blocking local controller inputs for a given e-sports gaming machine as shown at process block 922. This may be accomplished by controlling the switch 415 in the example e-sports gaming machine of FIG. 4 to prevent inputs from button panels 103, 105 and any game controllers 317 which may be connected. The process of FIG. 9 next includes generating gaming device setup control signals as shown at process block 924 and then communicating these gaming device setup control signals to the gaming device as shown at process block 925.

The process shown in FIG. 9 may be initiated in a number of different ways within the scope of the present invention. In some implementations an e-sports player may enroll in a tournament at a tournament enrollment device such as device 310 in FIG. 3. A player may also enroll in an e-sports tournament through an interface such as interface 418 included at e-sports gaming machine 101 in FIG. 4, or an additional gaming machine 326 locally in system 301, or through a gaming machine, enrollment station/kiosk, or e-sports gaming machine at a remote gaming site such as 328 in FIG. 3. After enrollment, the player may be directed to one of the e-sports gaming machines (101 in FIGS. 3 and 4) at a specific time. The player may then login to the gaming device 409 at that e-sports gaming machine. The setup state detection process shown in dashed box 902 in FIG. 9 may be initiated at the scheduled time for the player or perhaps somewhat before that time to ensure that the desired setup state is detected. In this example the setup state may be the state of the gaming device 409 and image output from the gaming device at the point in time at which the player is logged in to the video gaming system supported by the gaming device.

In the context of the example gaming system 301 shown in FIG. 3 and the example e-sports gaming machine 101 shown in FIG. 4, the image evaluation process shown at dashed box 902 in FIG. 9 may be performed by processor 408 operating as an image evaluation processor. In such an implementation, the output produced at block 912 in FIG. 9 may be a network communication initiated by processor 408. The process shown at dashed box 904 in FIG. 9 may be performed by e-sport system server 303 in concert with e-sports system game controller 321 in FIG. 3, together servicing as a tournament processing device. In particular, e-sport system server 303 may receive the output produced according to process block 912 in FIG. 9 as a communication over network 304 in FIG. 3. The e-sport system server 303 may then direct the e-sport system game controller 321 to send a command through path 319 to block local controller inputs (in accordance with block 922 in FIG. 9), and generate the appropriate gaming device setup control signals (in accordance with block 924 in FIG. 9). These gaming device setup control signals are communicated to the e-sports gaming machine and applied as gaming controller inputs (in accordance with block 925 in FIG. 9) by e-sports system game controller 321.

Figure 10:
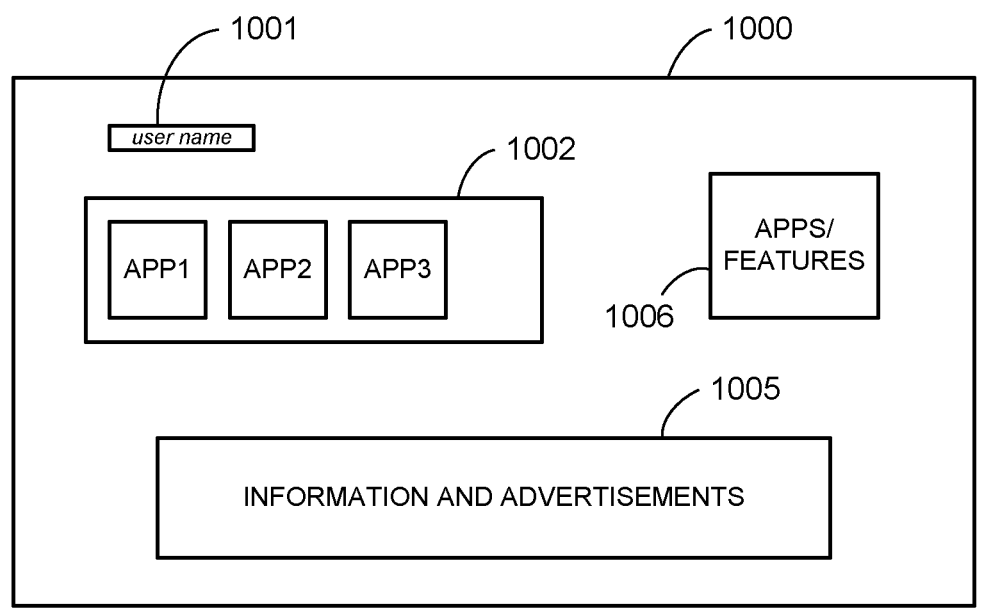
FIG. 10 is a schematic representation of a game image from which a setup state for a game may be identified.

The display image representation of FIG. 10 may be used to describe a set up display which may be detected according to the process in block dashed box 902 of FIG. 9. This display image 1000 in the example of FIG. 10 may, for example, be the display produced at gaming device 409 in FIG. 4 in response to a player logging on to the platform. Display image 1000 includes an area 1001 in which a username is displayed for the user that has logged on, along with an area 1002 for various applications (games) which are available on the gaming device 409. Image 1000 may include other information and advertisements as shown in field 1005 and other information in a field 1006. The state of the gaming device 409 indicated by image 1000 is a state in which the user/player may select a game, and then go through a sequence in which the player sets up play in the game by perhaps selecting an opponent and perhaps selecting other characteristics of game play. However, according to aspects of the present invention, this initial setup state is a state in which the e-sport system server 303 and virtual controller 321 may take over the setup process so that the respective e-sport gaming machine may be used to play a scheduled tournament e-sport game.

In implementations of the invention where the search conducted at block 909 in the process of FIG. 9 is performed by conducting a comparison of the pixel data from the sampled image and stored image data, the stored image data may include pixel definitions for any suitable characteristics of the example image shown in FIG. 10. A suitable characteristic or set of characteristics would be those that are unique to the setup state indicated by the image in FIG. 10. Where any of the areas or fields 1001, 1002, 1005, and 1006 include a border, the stored image data might include pixel data that would be expected to define the given border. As another example, where the location of the user name in the image is unique to the setup state, the search conducted at 909 in FIG. 9 may be a search for alphanumeric characters in the area 1001 in the pixel data defined by example image 1000. Such a search may be conducted by comparison to stored data or by any suitable algorithm.

Prior to the start of a tournament round, respective display screens 109 may prompt each player to respond and each player may be required to input (at the respective gaming machine 101) information requested on the display screen 109. For example, players may be prompted in this fashion to log in to the gaming device 409 of the gaming machine 101 (FIG. 3) and to otherwise enter identifying information. The prompt may be displayed as an overlay on display screen 109 of each gaming machine, or could be displayed at some other display device of the gaming machine such as player interface 418. Alternatively, the prompt may be displayed through a group display device such as display 305 in the example system shown in FIG. 3. In some instances, game play may comprise play of a live player with a virtual player, such that virtual controller 321 may be automated to play according to a selected player level, versus a live player entering inputs at the respective player gaming device. As game play proceeds, the live play displayed on respective display screens 109 may be shown substantially in real-time or replayed on various external displays 305 according to tournament software executed by the e-sports system server 303. When the selected games are completed, either in accordance with a timer or game rules, the winning player or team is determined by the e-sports system server 303 which causes the game results to be displayed on one or more display screens in the system 301.

Figure 11:
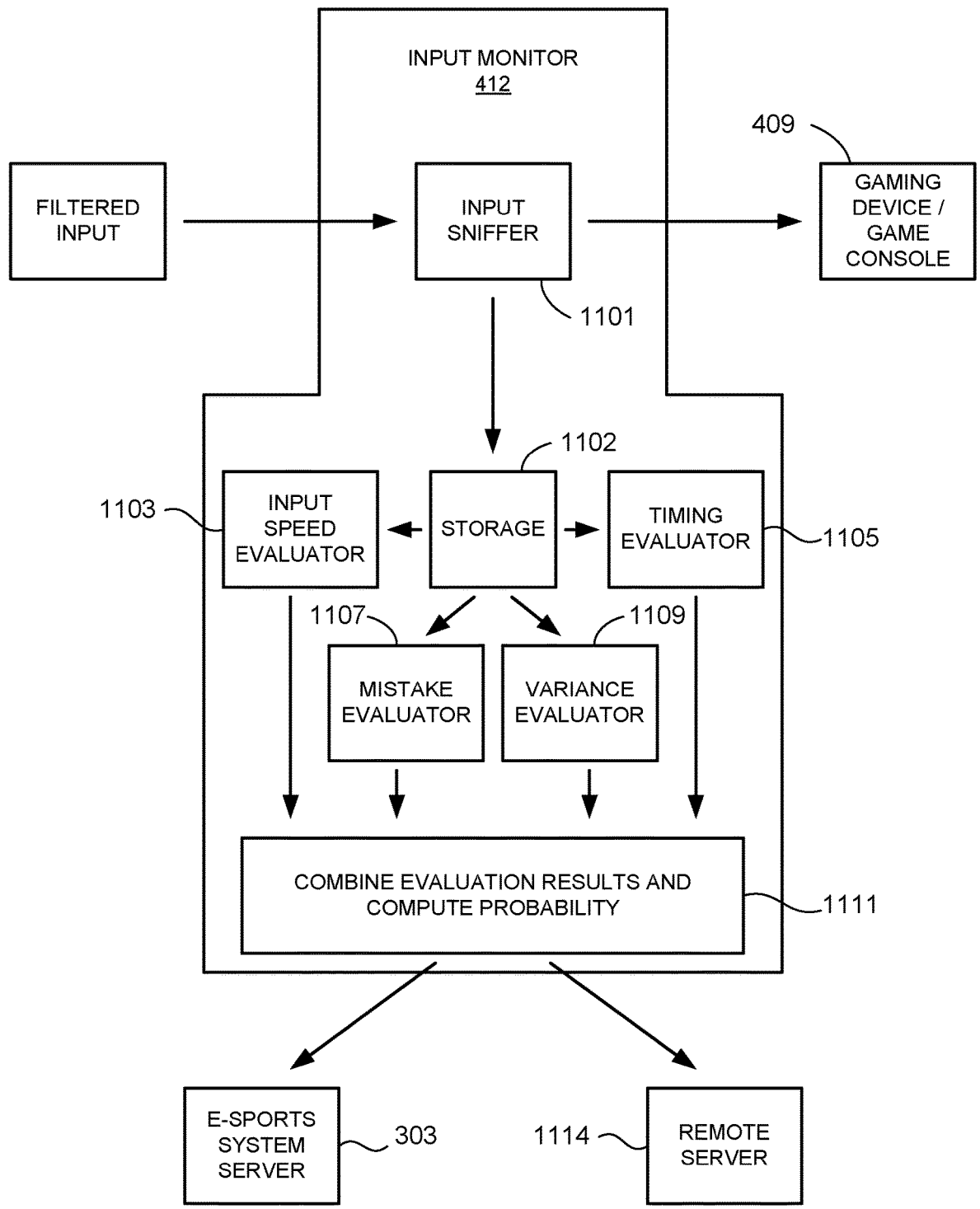
FIG. 11 is a block diagram of an example input monitor in accordance with one or more embodiments.
Figure 12:
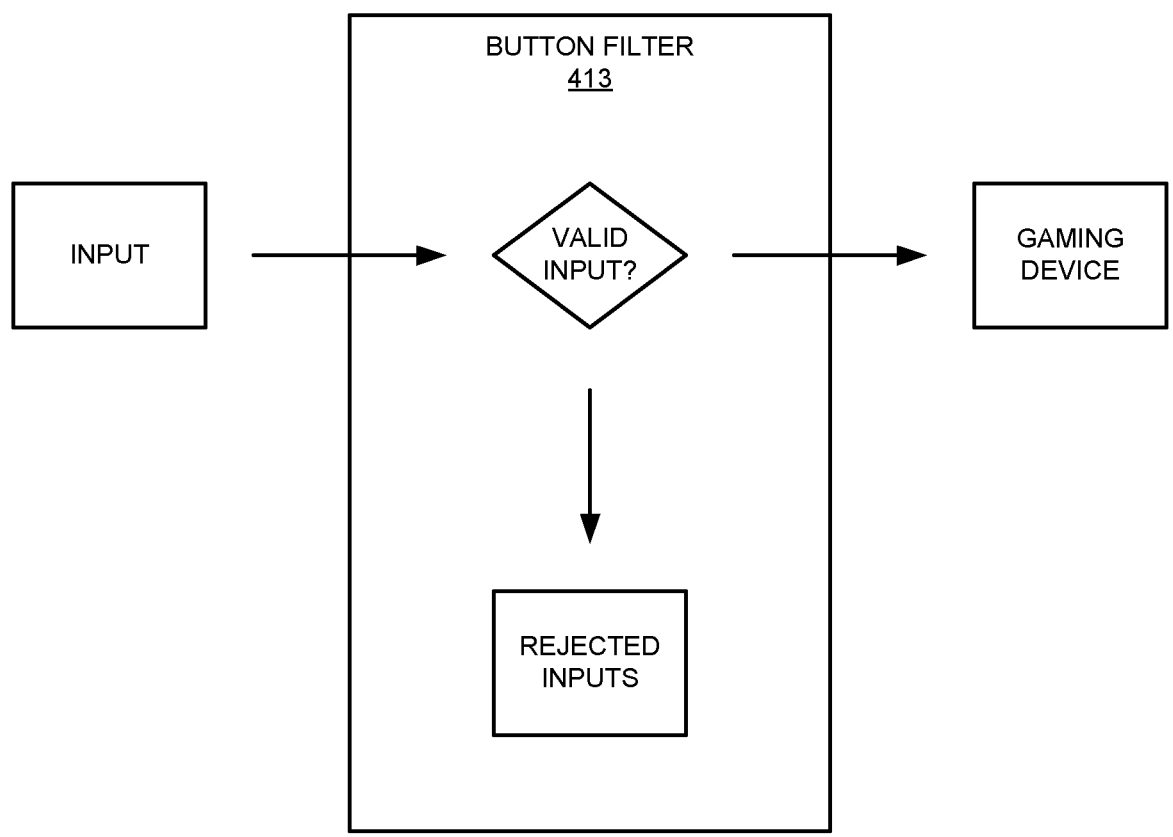
FIG. 12 is a block diagram illustrating an input filter in accordance with one or more embodiments.

FIGS. 11 and 12 may be used to describe further aspects of the input monitoring device (input monitor) 412 shown in the example e-sports gaming machine 101 of FIG. 4. The example input monitoring device 412 shown in FIG. 11 includes an input sniffer component 1101, a data storage unit 1102, an input speed evaluating unit 1103, an input timing evaluator unit 1105, an input mistake evaluator unit 1107, a variance evaluator unit 1109, and a probability determining unit 1111. Each unit may be a program module of an input monitoring device master program executed by a processor comprising input monitoring device 412 or they may comprise separate general purpose processors or separate application specific processors or circuitry dedicated to perform the specific function of the unit. These units (1103, 1105, 1107, and 1109) evaluate aspects of the data input ("game controller input") from a player game controller 317 shown in FIG. 4 or e-sports gaming machine button panel 103, 105 shown in FIG. 4. Input sniffer 1101 splits off the signal representing the game controller input for storage locally by data storage unit 1102 and evaluation by units 1103, 1105, 1107, and 1109, and also allows the game controller input to pass through to the gaming device 409. Once the game controller input has been stored by input monitoring device 412, one or more algorithms are triggered to read the data from storage 1102 and perform analysis to determine the probability that the game controller input was automated. Each evaluation unit 1103, 1105, 1107, and 1109 reports its results to probability determining unit 1111 which computes a final probability of automation associated with the game controller input. In the example arrangement shown in FIG. 11, this final result is communicated to the e-sports system server 303 and/or some other server 1114, either of which may direct further action based on the final result. In particular, the further action may be to disqualify the player associated with the game control input for a current game and/or ban the player for future e-sports games conducted through gaming system 301 in FIG. 3. In some implementations the further action may be automated, or may be made by a system operator after evaluating the output from unit 1111, which may be sent to a suitable display device associated with e-sports system server 303 or server 1114.

Referring to FIG. 12, an example input filter 413 is shown connected to receive the input from a player controller (such as controller 317 in FIG. 4) before the gaming device 409. Input filter 413 is configured to filter the signals resulting from certain button presses so that the signals do not reach gaming device 409. In particular, input filter 413 accepts inputs from player controller 317, compares each input signal to a list of unacceptable inputs, and filters out any that match. This determination is executed in a few microseconds as to not impact the timings or responsiveness of the input device (e.g. player controller 219). Additionally, all filtered inputs can be stored in memory associated with the input filter 413 along with a timestamp indicating the date and time the input was filtered.

The input filter device 413 is capable of holding multiple configurations, each with a unique list of unacceptable inputs to be filtered. Once a configuration is chosen, its list is then considered active and the device will reject all inputs matching the configuration.

One use case for input filter 413 is in a gaming tournament, where "pause" and "home" buttons are preferably not allowed to be pressed during a match. In this example, input filter 413 functions to filter out all "pause" and "home" button presses so that a player may not interrupt the game in progress.

Although the example e-sports tournament gaming machine 101 is shown as having a single display device 109 controlled by gaming device 409, other implementations may have an additional display controlled by suitable processor (such as processor 408 in the example of FIG. 4). This second display may be controlled by the processor and other elements in the system (such as e-sports system server 303) to display real-time leader board information including current relative positions of participants in tournament play within the second display area and may further be configured to display at least one of the player video feeds together with an individual result of play in a tournament game.

In the following description FIGS. 13 and 14 will be used to describe example gaming machines such as those shown at 326 in FIG. 3, or that may represent a remote wagering device such as 327 in FIG. 3. FIG. 15 will be used to describe a game a networked gaming system that may comprise a remote gaming site such as site 328 in FIG. 3 or may be included locally in the network representing the e-sports gaming system shown in FIG. 3.

Figure 13:
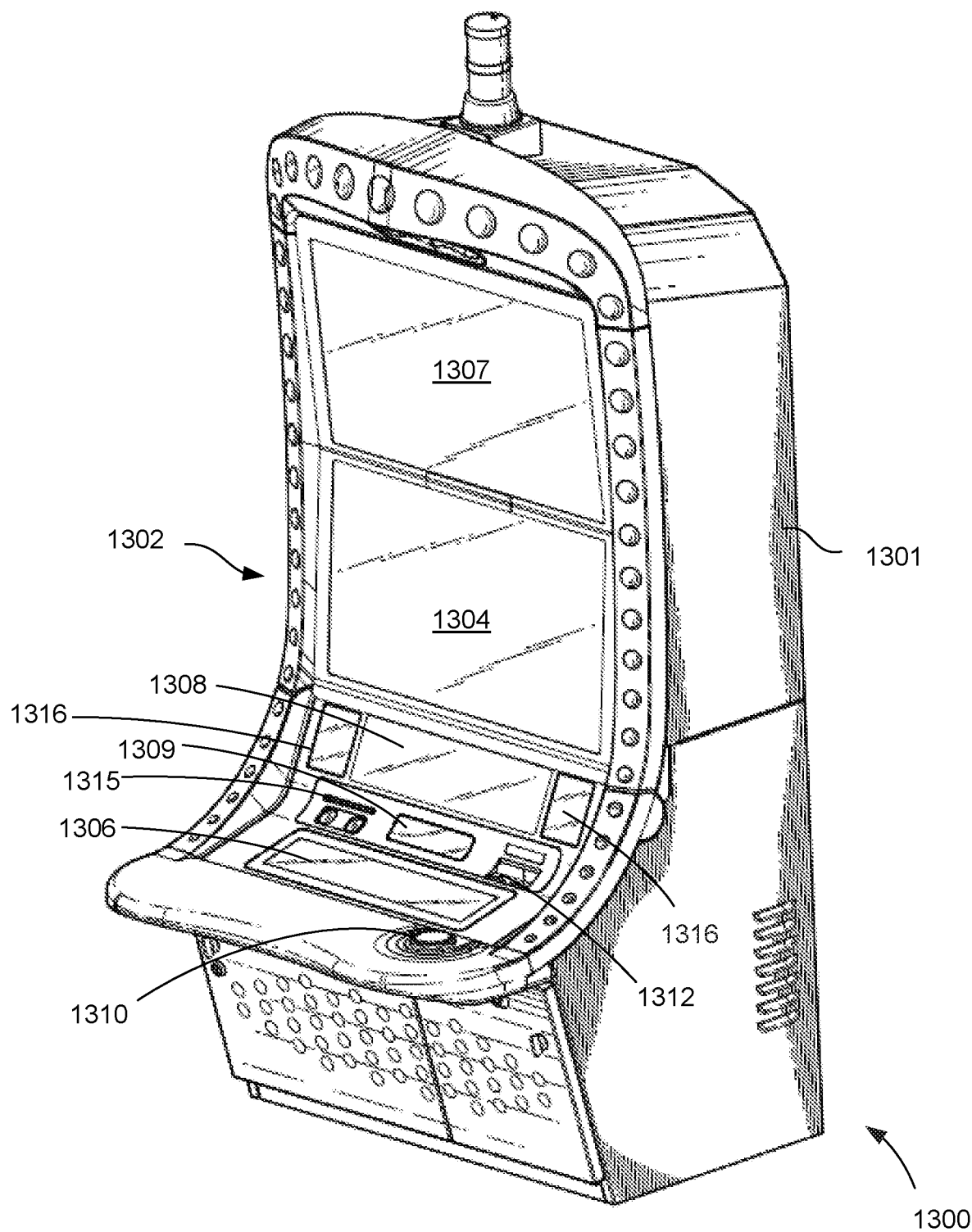
FIG. 13 is a perspective view of a gaming machine that may be used for placing wagers on games such as those conducted on the gaming machine shown in FIG. 1, and also for participating in a reel-type or other type of wagering game.

Referring to FIG. 13, gaming machine 1300 includes a cabinet 1301 having a front side generally shown at reference numeral 1302. A primary video display device 1304 is mounted in a central portion of the front side 1302, and a touch-screen button panel 1306 is positioned below the primary video display device. In addition to primary video display device 1304, the illustrated gaming machine 1300 includes a secondary video display device 1307 positioned above the primary video display device. Gaming machine 1300 also includes two additional smaller auxiliary display devices, an upper auxiliary display device 1308 and a lower auxiliary display device 1309. It should also be noted that each display device referenced herein may include any suitable display device including a cathode ray tube, liquid crystal display, plasma display, LED display, or any other type of display device currently known or that may be developed in the future. One or more of these video display devices, and especially primary video display device 1304, may be used to display graphics associated with e-sports play in a gaming system. For example, upper display 1307 may be used to display action in an e-sports game on which a player at gaming machine 1300 has wagered. As will be described further below in connection with FIG. 14 and elsewhere, it is also possible for gaming machines within the scope of the present invention to include mechanical elements such as mechanical reels. Generally, the display device or display devices of the gaming machine, whether video display devices, mechanical devices, or combinations of the two, which are used to display graphic elements according to embodiments of the invention may be described in this disclosure and the accompanying claims as a "display system."

The gaming machine 1300 illustrated for purposes of example in FIG. 13 also includes a mechanical control button 1310 mounted adjacent to touch-screen button panel 1306. This control button 1310 may allow a player to make a play input to start a play in a wagering game conducted through gaming machine 1300, while virtual buttons included (but not shown in this view) on button panel 1306 or other physical buttons or controls may allow a player to select a bet level for a game implemented at the gaming machine or for an e-sports competition and select a type of game or game feature. Other forms of gaming machines through which the invention may be implemented may include switches, joysticks, or other mechanical input devices, in addition to the virtual buttons and other controls implemented on touch-screen button panel 1306. For example, primary video display device 1304 in gaming machine 1300 provides a convenient display device for implementing touch screen controls in addition to or in lieu of controls included on touch-screen button panel 1306 or mechanical controls. The player interface devices which receive player inputs in the course of a game played through the gaming machine or for e-sports wagers placed through the gaming machine 1300, such as controls to select a wager amount for a given play, controls to enter a play input to actually start a given play in the wagering game, or controls to allow a player to make other player selections in a game according to the present invention, may be referred to generally as a "player input system."

It will be appreciated that gaming machines may also include a number of other player interface devices in addition to devices that are considered player controls for use in entering inputs in the course of a particular game. Gaming machine 1300 also includes a currency/voucher acceptor having an input ramp 1312, a voucher/receipt printer having a voucher/receipt output 1315, and a player card reader (not shown in the view of FIG. 13). Numerous other types of player interface devices may be included in gaming machines that may be used to implement embodiments of the present invention.

A gaming machine which may be used as a wagering device for e-sports competitions in a system such as that shown in FIG. 3 may also include a sound system to provide an audio output to enhance the user's playing experience. For example, illustrated gaming machine 1300 includes speakers 1316 which may be driven by a suitable audio amplifier (not shown) to provide a desired audio output at the gaming machine.

Figure 14:
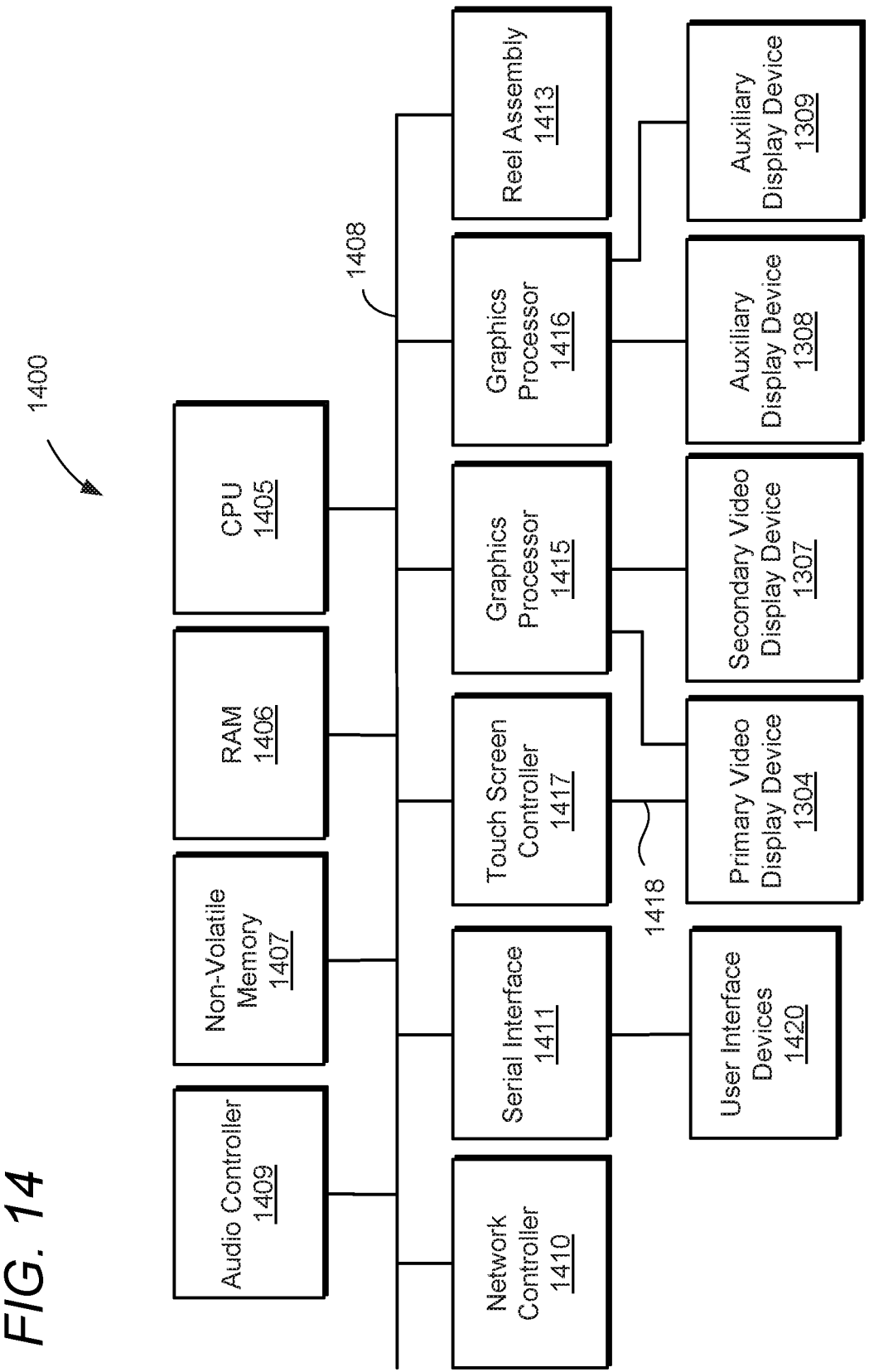
FIG. 14 is a block diagram showing the various components that may be included in the gaming machine shown in FIG. 13.
Figure 15:
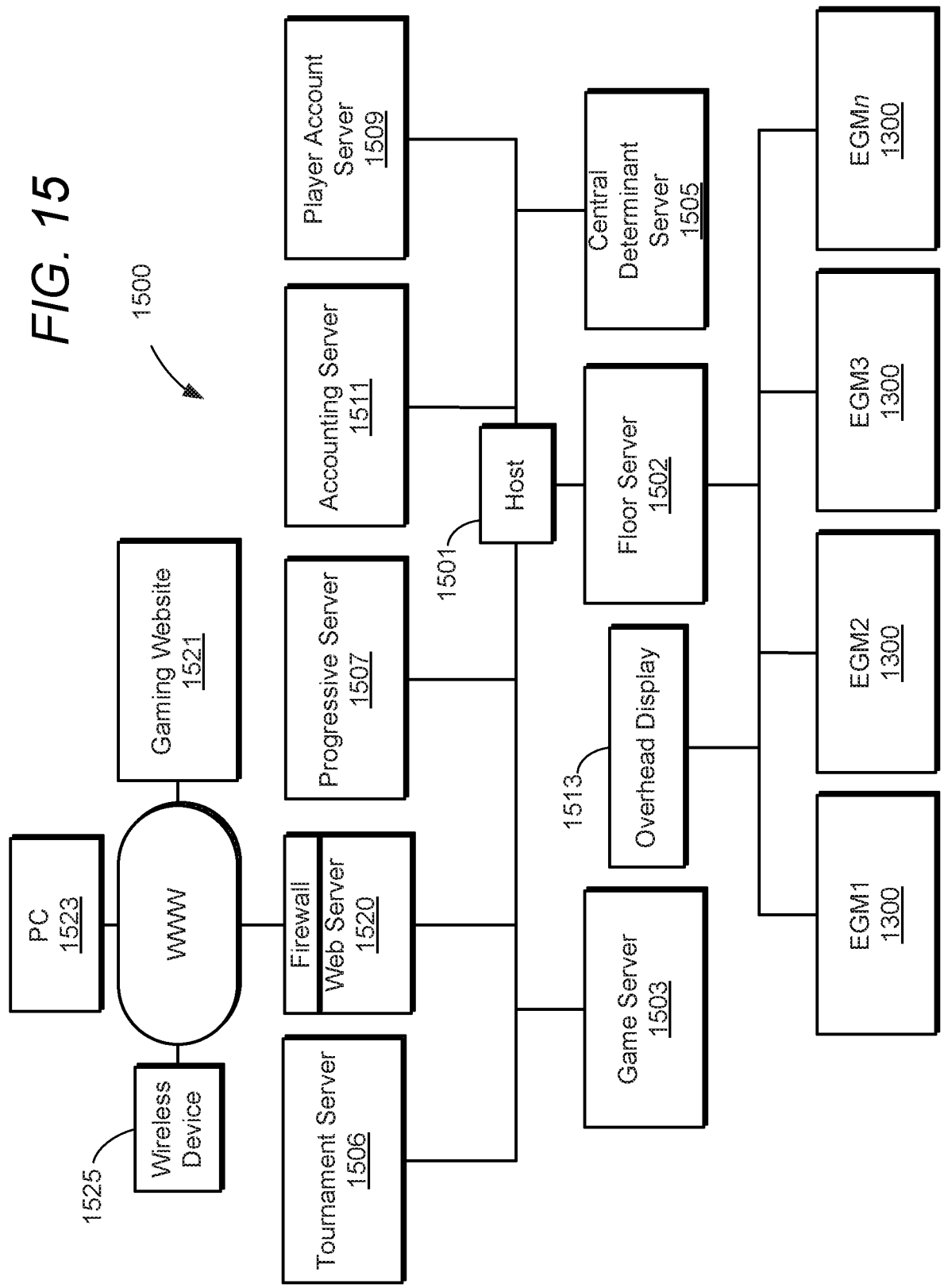
FIG. 15 is a block diagram of a gaming system including gaming machines such as that shown in FIG. 13.

FIG. 14 shows a logical and hardware block diagram 1400 of gaming machine 1300 which includes a processor (CPU) 1405 along with random access memory (RAM) 1406 and nonvolatile memory or storage device 1407. All of these devices are connected on a system bus 1408 with an audio controller device 1409, a network controller 1410, and a serial interface 1411. A graphics processor 1415 is also connected on bus 1408 and is connected to drive primary video display device 1304 and secondary video display device 1307 (both mounted on cabinet 1301 as shown in FIG. 13). A second graphics processor 1416 is also connected on bus 1408 in this example to drive the auxiliary display devices 1308 and 1309 also shown in FIG. 13. As shown in FIG. 14, gaming machine 1300 also includes a touch screen controller 1417 connected to system bus 1408. Touch screen controller 1417 is also connected via signal path 1418 to receive signals from a touch screen element associated with primary video display device 1304 or touch-screen button panel 1306 or both. It will be appreciated that the touch screen element itself typically comprises a thin film that is secured over the display surface of the respective display device such as the display device of touch-screen button panel 1306 in FIG. 1. The touch screen element itself is not illustrated or referenced separately in the figures.

Those familiar with data processing devices and systems will appreciate that other basic electronic components will be included in gaming machine 1300 such as a power supply, cooling systems for the various system components, audio amplifiers, and other devices that are common in gaming machines. These additional devices are omitted from the drawings so as not to obscure the present invention in unnecessary detail.

All of the elements 1405, 1406, 1407, 1408, 1409, 1410, and 1411 shown in FIG. 14 are elements commonly associated with a personal computer. These elements may be mounted on (or connected to) a standard personal computer motherboard and housed in a standard personal computer housing which itself may be mounted in cabinet 1301 shown in FIG. 13. Alternatively, the various electronic components may be mounted on one or more circuit boards housed within cabinet 1301 without a separate enclosure such as those found in personal computers. Those familiar with data processing systems and the various data processing elements shown in FIG. 14 will appreciate that many variations on this illustrated structure may be used within the scope of the present invention. For example, since serial communications are commonly employed to communicate with a touch screen controller such as touch screen controller 1417, the touch screen controller may not be connected on system bus 1408, but instead include a serial communications line to serial interface 1411, which may be a USB controller for example. It will also be appreciated that some of the devices shown in FIG. 14 as being connected directly on system bus 1408 may in fact communicate with the other system components through a suitable expansion bus. Audio controller 1409, for example, may be connected to the system via a PCI or PCIe bus. System bus 1408 is shown in FIG. 14 merely to indicate that the various components are connected in some fashion for communication with CPU 1405 and is not intended to limit the invention to any particular bus architecture. Numerous other variations in the gaming machine internal structure and system may be used without departing from the principles of the present invention. For example, a gaming machine in some embodiments of the present invention may rely on one or more data processors which are located remotely from the gaming machine itself. Embodiments of the present invention may include no processor such as CPU 1405 or graphics processors such as 1415 and 1416 at the gaming machine, and may instead rely on one or more remote processors. Thus unless specifically stated otherwise, the designation "gaming machine" is used in this disclosure and the accompanying claims to designate a system of devices which operate together to provide the indicated functions. A "gaming machine" may include a gaming machine such as gaming machine 1300 shown in FIGS. 13 and 14, which is itself a system of various components, and may also include one or more components remote from a gaming machine cabinet (that is, cabinet 1301 in FIG. 13). Thus the designation "gaming machine" encompasses both a stand-alone gaming machine and a gaming machine (that is, the part housed in a cabinet such as cabinet 1301 in FIG. 13) along with one or more remote components for providing various functions (such as generating outcomes for plays in a game, and driving display devices mounted in the gaming machine cabinet).

It will also be appreciated that graphics processors are also commonly a part of modern computer systems. Although separate graphics processor 1415 is shown for controlling primary video display device 1304 and secondary video display device 1307, and graphics processor 1416 is shown for controlling both auxiliary display devices 1408 and 1409, CPU 1405 or a graphics processor packaged with or included with CPU 1405 may control all of the display devices directly without any separately packaged graphics processor. The invention is not limited to any particular arrangement of processing devices for controlling the video display devices included with gaming machine 1300. Also, a gaming machine implementing the present invention is not limited to any particular number of video display devices or other types of display devices.

In the illustrated gaming machine 1300, CPU 1405 executes software, that is, program code, which ultimately controls the entire gaming machine including the receipt of player inputs and the presentation of the graphics or information displayed according to the invention through the display devices 1304, 1307, 1308, and 1309 associated with the gaming machine. CPU 1405 also executes software related to communications handled through network controller 1410, and software related to various peripheral devices such as those connected to the system through audio controller 1409, serial interface 1411, and touch screen controller 1417. CPU 1405 may also execute software to perform accounting functions associated with game play. Random access memory 1406 provides memory for use by CPU 1405 in executing its various software programs while the nonvolatile memory or storage device 1407 may comprise a hard drive or other mass storage device providing storage for game software or e-sports wagering modules (program code) prior to loading into random access memory 1406 for execution, or for programs not in use or for other data generated or used in the course of gaming machine operation. Network controller 1410 provides an interface to other components of a gaming system in which gaming machine 1300 may be included. An example network will be described below in connection with FIG. 15.

It should be noted that the invention is not limited to gaming machines employing the personal computer-type arrangement of processing devices and interfaces shown in example gaming machine 1300. Other gaming machines through which the invention may be implemented may include one or more special purpose processing devices to perform the various processing steps for implementing the invention. Unlike general purpose processing devices such as CPU 1405, which may comprise an Intel Pentium® or Core® processor for example, these special purpose processing devices may not employ operational program code to direct the various processing steps.

The example gaming machine 1300 is shown in FIG. 14 as including user interface devices 1420 (part of a player input system) connected to serial interface 1411. These user interface devices may include various player input devices such as mechanical buttons shown on touch-screen button panel 1306 in FIG. 13, and/or levers, and other devices. It will be appreciated that the interface between CPU 1405 and other player input devices such as player card readers, voucher readers or printers, and other devices may be in the form of serial communications. Thus serial interface 1411 may be used for those additional devices as well, or the gaming machine may include one or more additional serial interface controllers. However, the interface between peripheral devices in the gaming machine, such as player input devices, is not limited to any particular type or standard for purposes of the present invention.

Reel Assembly 1413 is shown in the diagrammatic representation of FIG. 14 to illustrate that a gaming machine which may serve as a remote wagering device such as 327 in FIG. 3 or an additional gaming machine 326 in FIG. 3 may include mechanical reels. For example, a number of sets of mechanical reels may replace the primary display device 1304, or at least part of that display device. Alternatively, mechanical reels may be included in the gaming machine behind a light-transmissive video display panel. In either case, the mechanical reels represent a display device for displaying various game symbols in the course of a game play. Although the invention is not limited to any particular mechanical reel arrangement or control system, mechanical reels may be controlled conveniently through serial communications which provide instructions for a respective stepper motor for each reel. Thus some embodiments of the present invention which employ mechanical reels may use a serial interface device such as serial interface 1411 to control communications with the reel assembly, and may not include a direct bus interconnection as indicated by FIG. 14. Details of a mechanical reel arrangement and various accent lighting arrangements which may be associated with mechanical reels are not shown in the present figures so as to avoid obscuring the present invention in unnecessary detail.

Referring now to FIG. 15, a networked gaming system 1500 associated with one or more gaming facilities such as remote gaming site 328 in FIG. 3 or co-located with e-sports gaming system 301 in FIG. 3 may include one or more networked gaming machines 1300 ("electronic gaming machines" or "EGM's") connected in the network by suitable network cable or wirelessly. Networked gaming machines 1300 (EGM1-EGMn) and one or more overhead displays 1513 may be operatively connected so that the overhead display or displays may mirror or replay the content of one or more displays of gaming machines 1300. For example, the primary display content for a given gaming machine 1300 (including a game play according to the present invention) may be transmitted through network controller 1410 to a controller associated with the overhead display(s) 1513. In the event gaming machines 1300 have cameras installed, the respective player's video images may be displayed on overhead display 1513 along with the content of the player's gaming machine display.

The example gaming network 1500 shown in FIG. 15 includes a host server 1501 and floor server 1502, which together may function as an intermediary between floor devices such as gaming machines 1300 and back office devices such as the various servers described below. Game server 1503 may provide server-based games and/or game services to network connected gaming devices such as gaming machines 1300. Central determinant server 1505 may be included in the network to identify or select lottery, bingo, or other centrally determined game outcomes and provide the outcome information to networked gaming machines 1300 which present the games to players.

Tournament server 1506 may be included in the system for controlling or coordinating tournament functions outside of an e-sports system such as system 301 in FIG. 3. These functions may include maintaining tournament player scores and ranking in real time during the course of tournament play, and communicating this information to the various gaming machines 1300 participating in the tournament. Tournament server 1506 may also function to enroll players in tournaments, schedule tournaments, and maintain the time remaining in the various tournaments.

Progressive server 1507 may maintain progressive pools for progressive games which may be available through the various gaming machines 1300. In some implementations, progressive server 1507 may simply receive communications indicating contribution amounts which have been determined by processes executing at the various gaming machines 1300 or elsewhere in the gaming network. Alternatively, progressive server 1507 may perform processes to determine the contribution amounts for incrementing the various progressive pools which may be maintained. Progressive server 1507 may also periodically communicate current pool values back to the various gaming machines 1300, and may participate in communicating awarded progressive prize amounts to the gaming machines and making adjustments to the progressive prize pools accordingly. In some implementations, progressive server 1507 may also determine or participate in determining when a progressive prize triggering event occurs.

Accounting server 1511 may receive gaming data from each of the networked gaming devices, perform audit functions, and provide data for analysis programs. Player account server 1509 may maintain player account records, and store persistent player data such as accumulated player points and/or player preferences (for example, game personalizing selections or options).

Example gaming network 1500 also includes a gaming website 1521 which may be hosted through web server 1520 and may be accessible by players via the Internet. One or more games may be displayed as described herein and played by a player through a personal computer 1523 or handheld wireless device 1525 (for example, a Blackberry® cell phone, Apple® iPhone®, personal digital assistant (PDA), iPad®, etc.). To enter website 1521, a player may log in with a user name that may, for example, be associated with the player's account information stored on player account server 1509. Once logged in to website 1521 the player may play various games on the website, including games according to the invention. Also website 1521 may allow the player to make various personalizing selections and save the information so it is available for use during the player's next gaming session at a casino establishment having the gaming machines 1300.

It will be appreciated that gaming network 1500 illustrated in FIG. 15 is provided merely as an example of a gaming network which may facilitate e-sports wagering in addition to traditional gaming, and is not intended to be limiting in any way. An e-sports gaming system according to aspects of the present invention is not limited to use with gaming networks such as network 1500.

There is also wide variation possible in e-sports gaming machines within the scope of the present invention. In addition to e-sports tournament components described above in connection with FIG. 4, the e-sports tournament gaming machines such as gaming machine 101 may optionally include conventional gaming components, such as printers and bill acceptors, operable to provide traditional wagering games. The e-sports gaming machines may also be automatically convertible between in-revenue and out-of-revenue operating modes through instructions transmitted by e-sports system server 303 or a separate tournament server. Additionally the e-sports tournament gaming machines 101 may include video cameras connected to provide live video feed to one or more external displays such as displays 330 in FIG. 3, such as during tournament play when live video feed of the players and the player tournament positions may be driven in real-time to the external displays. More detailed descriptions of the in-revenue and out-of-revenue gaming machine configurations and automation together with a tournament server is more fully described in U.S. Pat. No. 9,443,394 filed Jun. 24, 2013, and entitled "Convertible In-Revenue and Out-of-Revenue Gaming System and Method with a Real-Time Streaming Video Feed and Display" which is incorporated by reference.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination. Also, although the above description refers to the evaluation of a video signal from a game to determine a result or setup state of the game, the audio signal of a game may also be evaluated to determine or to aid in determining a result or setup state of the game.

The invention claimed is:

1. A method including:
   (a) receiving a wager through a wager input device, the wager being placed on a game to be conducted through a video gaming system;
   (b) at an image evaluation processing system, receiving a game video signal, the game video signal comprising a video signal generated at a processor of the video gaming system for communication to a display device of the video gaming system to cause the display device to display a sequence of images representing the game;
   (c) receiving a probability of a result occurring in the game, the probability being received from a wagering backend processing system;
   (d) evaluating the received game video signal at the image evaluation processing system to identify the result in the game; and
   (e) when the result of the game identified by the evaluation of the received game video signal is a winning result for the wager, resolving the wager by making an award of value for the wager, wherein resolving the wager includes applying the probability of the result occurring in the game.

2. The method of claim 1 wherein evaluating the received game video signal includes:
   (a) searching pixel data of a respective frame from the game video signal for a result characteristic corresponding to the result in the game; and
   (b) in response to detection of the result characteristic corresponding to the result in the game, producing an output indicative of the result.

3. The method of claim 2 further including:
   (a) searching the pixel data of the respective frame from the game video signal for a threshold characteristic corresponding to a display graphic in which the result characteristic is displayed according to the game; and
   (b) when the threshold characteristic is not detected in the respective frame from the game video signal, searching pixel data for a subsequent frame from the game video signal for the threshold characteristic.

4. The method of claim 3 wherein searching the pixel data of the respective frame from the game video signal for the result characteristic is performed in response to the detection of the threshold characteristic in the respective frame.

5. The method of claim 2 wherein searching the pixel data of the respective frame from the game video signal for the result characteristic includes searching for alphanumeric characters at one or more locations in the respective frame.

6. The method of claim 2 wherein searching the pixel data of the respective frame from the game video signal for the result characteristic includes searching for a color at one or more locations in the respective frame.

7. The method of claim 2 wherein searching the pixel data of the respective frame from the game video signal for the result characteristic includes searching for one or more geometrical shapes in the respective frame.

8. The method of claim 1 wherein the wager input device is located in a gaming device which includes a game processor, a game display screen, and a game controller interface for the game processor.

9. A gaming system comprising:
(a) a gaming device for a video gaming system;
(b) one or more video monitors operatively connected to receive a game video signal for a game in the video gaming system and conducted through the gaming device;
(c) a wager input device configured to receive a wager on a result in the game;
(d) an image evaluation processing system operatively connected to receive the game video signal, the image evaluation processing system being configured to evaluate the game video signal to identify the result in the game; and
(e) a wager resolution system operatively connected to the image evaluation processing system and to the wager input device and including a wagering backend processing system configured to determine a probability of the result occurring in the game, the wager resolution system being configured to receive the wager and the result identified by the image evaluation processing system, and, when the result identified by the image evaluation processing system is a winning result for the wager, to resolve the wager by awarding value for the wager, wherein resolving the wager includes applying the probability of the result occurring in the game.

10. The gaming system of claim 9 further including a tournament processing device operatively connected to the image evaluation processing system, and having a separate operative connection to the gaming device or to the gaming device and one or more additional gaming devices for the video gaming system, the tournament processing device being configured to receive play requests for the game from two or more players, to produce setup control signals, and to output the setup control signals to the gaming device or to the gaming device and the one or more additional gaming devices, the setup control signals being configured to set up and initiate a match on the video gaming system between the two or more players.

11. The gaming system of claim 10 wherein the image evaluation processing system is configured to identify a respective play request for the game from one or more frames of the received game video signal.

12. The gaming system of claim 9 wherein the image evaluation processing system is configured to:

(a) search pixel data of a respective frame from the game video signal for a result characteristic corresponding to the result in the game; and
(b) in response to detection of the result characteristic corresponding to the result in the game, produce an output indicative of the result.

13. The gaming system of claim 12 wherein the image evaluation processing system is configured to:
(a) search the pixel data of the respective frame from the game video signal for a threshold characteristic corresponding to a display graphic in which the result characteristic is displayed according to the game; and
(b) when the threshold characteristic is not detected in the respective frame from the game video signal, search pixel data for a subsequent frame from the game video signal for the threshold characteristic.

14. The gaming system of claim 13 wherein the search of the pixel data of the respective frame from the game video signal for the result characteristic is performed in response to the detection of the threshold characteristic in the respective frame.

15. A program product comprising one or more non-transitory computer readable data storage devices storing program code, the program code including:
(a) wager input program code executable to receive a wager on a result of a game on a video gaming system;
(b) image evaluation program code executable to evaluate a game video signal generated for the game and to identify the result in the game, the game video signal comprising a video signal generated at a processor of the video gaming system for communication to a display device of the video gaming system to cause the display device to display a sequence of images representing the game;
(c) wagering backend program code executable to determine a probability of the result occurring in the game; and
(d) wager resolution program code executable to receive the wager and the result identified by the image evaluation program code, and, when the result identified by the image evaluation program code is a winning result for the wager, to resolve the wager by making an award of value for the wager wherein resolving the wager includes applying the probability of the result occurring in the game.

16. The program product of claim 15 further including tournament program code executable to receive play requests for two or more players, to produce setup control signals, and to output the setup control signals to a gaming device for the video gaming system or to the gaming device and one or more additional gaming devices for the video gaming system, the setup control signals being configured to set up and initiate a match on the video gaming system between the two or more players.

17. The program product of claim 15 wherein the image evaluation program code is executable to evaluate the game video signal generated for the game by:
(a) searching pixel data of a respective frame from the game video signal for a result characteristic corresponding to the result in the game; and
(b) in response to detection of the result characteristic corresponding to the result in the game, producing an output indicative of the result.

18. A gaming system comprising:
(a) a gaming device for a video gaming system;

(b) one or more video monitors operatively connected to receive a game video signal for a game in the video gaming system and conducted through the gaming device;

(c) a wager input device configured to receive a wager on a result in the game;

(d) an image evaluation processing system operatively connected to receive the game video signal, the image evaluation processing system being configured to evaluate the game video signal to identify the result in the game and to identify a respective play request for the game from one or more frames of the received game video signal;

(e) a wager resolution system operatively connected to the image evaluation processing system and to the wager input device, the wager resolution system being configured to receive the wager and the result identified by the image evaluation processing system, and, when the result identified by the image evaluation processing system is a winning result for the wager, to resolve the wager by awarding value for the wager; and (f) a tournament processing device operatively connected to the image evaluation processing system, and having a separate operative connection to the gaming device or to the gaming device and one or more additional gaming devices for the video gaming system, the tournament processing device being configured to receive play requests for the game from two or more players, to produce setup control signals, and to output the setup control signals to the gaming device or to the gaming device and the one or more additional gaming devices, the setup control signals being configured to set up and initiate a match on the video gaming system between the two or more players.

* * * * *